(12) United States Patent
Adamson et al.

(10) Patent No.: US 10,510,026 B1
(45) Date of Patent: Dec. 17, 2019

(54) ELECTRONIC CALENDARING SYSTEM AND METHOD DETERMINING REDUNDANT MEETING INVITEES BASED ON A MEETING COMPOSITION SCORE

(71) Applicant: WeWork Companies Inc., New York, NY (US)

(72) Inventors: Dal Adamson, Salt Lake City, UT (US); Ron Ross, Salt Lake City, UT (US); Zachary Dean Holmquist, Salt Lake City, UT (US); Joe Reis, Salt Lake City, UT (US); Ken Myers, Salt Lake City, UT (US); Dylan Gregersen, Salt Lake City, UT (US)

(73) Assignee: WeWork Companies Inc., New York, NY (US)

( * ) Notice: Subject to any disclaimer, the term of this patent is extended or adjusted under 35 U.S.C. 154(b) by 825 days.

(21) Appl. No.: 15/136,779

(22) Filed: Apr. 22, 2016

Related U.S. Application Data

(60) Provisional application No. 62/236,889, filed on Oct. 3, 2015.

(51) Int. Cl.
*G06Q 10/06* (2012.01)
*G06F 9/54* (2006.01)
*G06N 20/00* (2019.01)

(52) U.S. Cl.
CPC ....... *G06Q 10/06311* (2013.01); *G06F 9/543* (2013.01); *G06N 20/00* (2019.01)

(58) Field of Classification Search
CPC ............... G06Q 10/109; G06Q 10/06; G06Q 10/06314; G06Q 10/1093; G06Q 10/063116; G06Q 10/10; G06Q 10/1095
See application file for complete search history.

(56) References Cited

U.S. PATENT DOCUMENTS

| | | | | |
|---|---|---|---|---|
| 4,445,181 A * | 4/1984 | Yatman | ................... | G04F 10/00 702/178 |
| 7,283,970 B2 * | 10/2007 | Cragun | ................ | G06Q 10/109 705/7.19 |
| 8,065,175 B1 * | 11/2011 | Lewis | ............ | G06Q 10/063116 705/7.19 |

(Continued)

OTHER PUBLICATIONS

Gellert, Lauren, Meeting Cost Calculator with Timer Laurencegellert. com, Feb. 14, 2015 (Year: 2015).*

(Continued)

*Primary Examiner* — Scott L Jarrett
(74) *Attorney, Agent, or Firm* — Perkins Coie LLP

(57) ABSTRACT

This disclosure describes, according to some implementations, a method for scoring electronic meeting requests for attendee redundancy. In an example method, the method includes retrieving, using one or more processors, user IDs of meeting attendees; retrieving, using the one or more processors, one or more characteristics associated with the user IDs; retrieving, using the one or more processors, a rule having one or more parameters for scoring meeting composition; comparing, using the one or more processors, the one or more characteristics associated with the user IDs based on the one or more parameters of the rule; and generating, using the one or more processors, a meeting score based on the comparison.

17 Claims, 10 Drawing Sheets

(56) References Cited

U.S. PATENT DOCUMENTS

| | | | |
|---|---|---|---|
| 8,200,520 B2* | 6/2012 | Chen | G06Q 10/06312 705/7.19 |
| 8,458,057 B1* | 6/2013 | Youngs | G06Q 10/1095 705/32 |
| 8,489,615 B2* | 7/2013 | Dhara | H04L 12/1818 707/748 |
| 9,213,952 B2* | 12/2015 | Heyman | G06Q 10/06 |
| 9,652,500 B2* | 5/2017 | Grus | G06Q 10/063 |
| 9,779,144 B1* | 10/2017 | Hampson | G06F 16/93 |
| 10,002,345 B2* | 6/2018 | Ganani | G06F 16/335 |
| 2002/0188490 A1 | 12/2002 | Kruse | |
| 2003/0158874 A1* | 8/2003 | Graham | G06Q 10/10 |
| 2005/0010464 A1* | 1/2005 | Okuno | G06Q 10/0631 705/7.12 |
| 2006/0293943 A1* | 12/2006 | Tischhauser | G06Q 10/06314 705/7.24 |
| 2007/0005409 A1* | 1/2007 | Boss | G06Q 10/109 705/7.19 |
| 2007/0016661 A1* | 1/2007 | Malik | G06Q 10/109 709/223 |
| 2007/0021997 A1* | 1/2007 | Hayes, Jr. | G06Q 10/109 705/7.19 |
| 2008/0300944 A1* | 12/2008 | Surazski | G06Q 10/06311 705/7.13 |
| 2009/0063993 A1* | 3/2009 | Nyamgondalu | G06Q 10/109 715/752 |
| 2009/0083105 A1* | 3/2009 | Bhogal | G06Q 10/109 705/7.19 |
| 2009/0165022 A1* | 6/2009 | Madsen | G06Q 10/109 719/318 |
| 2009/0210271 A1* | 8/2009 | Abrams | G06Q 10/10 709/205 |
| 2009/0210351 A1* | 8/2009 | Bush | G06Q 10/109 705/80 |
| 2009/0307044 A1* | 12/2009 | Chakra | G06Q 10/109 705/7.18 |
| 2009/0327227 A1 | 12/2009 | Chakra et al. | |
| 2010/0088144 A1 | 4/2010 | Collet et al. | |
| 2010/0106627 A1* | 4/2010 | O'Sullivan | G06Q 10/109 705/30 |
| 2010/0233212 A1 | 9/2010 | Dubensky, Jr. et al. | |
| 2010/0235212 A1* | 9/2010 | Godfrey | G06Q 10/109 705/7.19 |
| 2011/0040591 A1* | 2/2011 | Durocher | G06Q 10/06375 705/7.35 |
| 2011/0154221 A1* | 6/2011 | DeLuca | G06Q 10/107 715/752 |
| 2011/0307287 A1* | 12/2011 | Conley | G06Q 10/109 705/7.19 |
| 2013/0263020 A1 | 10/2013 | Heiferman et al. | |
| 2013/0332219 A1* | 12/2013 | Clark | G06Q 30/02 705/7.19 |
| 2014/0372162 A1 | 12/2014 | Dhara et al. | |
| 2015/0058057 A1 | 2/2015 | Egan et al. | |
| 2015/0088567 A1 | 3/2015 | Lambroschini | |
| 2015/0088997 A1* | 3/2015 | van Dijk | G06Q 10/10 709/206 |
| 2015/0154566 A1* | 6/2015 | Saxena | G06Q 10/1095 705/7.19 |
| 2015/0199402 A1 | 7/2015 | Agrawal et al. | |
| 2015/0371195 A1* | 12/2015 | Boss | G06Q 10/1095 705/7.19 |
| 2016/0019490 A1* | 1/2016 | Fuller | G06Q 10/06393 705/7.39 |
| 2016/0134570 A1 | 5/2016 | Yin et al. | |
| 2016/0180259 A1 | 6/2016 | Marianko et al. | |
| 2017/0083872 A1 | 3/2017 | Blomberg et al. | |
| 2017/0308866 A1 | 10/2017 | Dotan-Cohen et al. | |
| 2019/0005462 A1 | 1/2019 | Brennan et al. | |

OTHER PUBLICATIONS

Merrill, Scott, Time is Money: a review of the Meeting Cost Calculator and Clock CrunchGear.com, Apr. 23, 2010 (Year: 2010).*

* cited by examiner

ELECTRONIC CALENDARING SYSTEM AND METHOD DETERMINING REDUNDANT MEETING INVITEES BASED ON A MEETING COMPOSITION SCORE

CROSS-REFERENCE TO RELATED APPLICATIONS

The present application claims the benefit under 35 U.S.C. § 119(e) of U.S. Provisional Patent Application Ser. No. 62/236,889, titled "Generation, Provision, and Machine Learning of Meeting-Related Analytics", filed on Oct. 3, 2015, the entire contents of which are incorporated herein by reference.

BACKGROUND

The present disclosure relates to existing automated scheduling systems.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
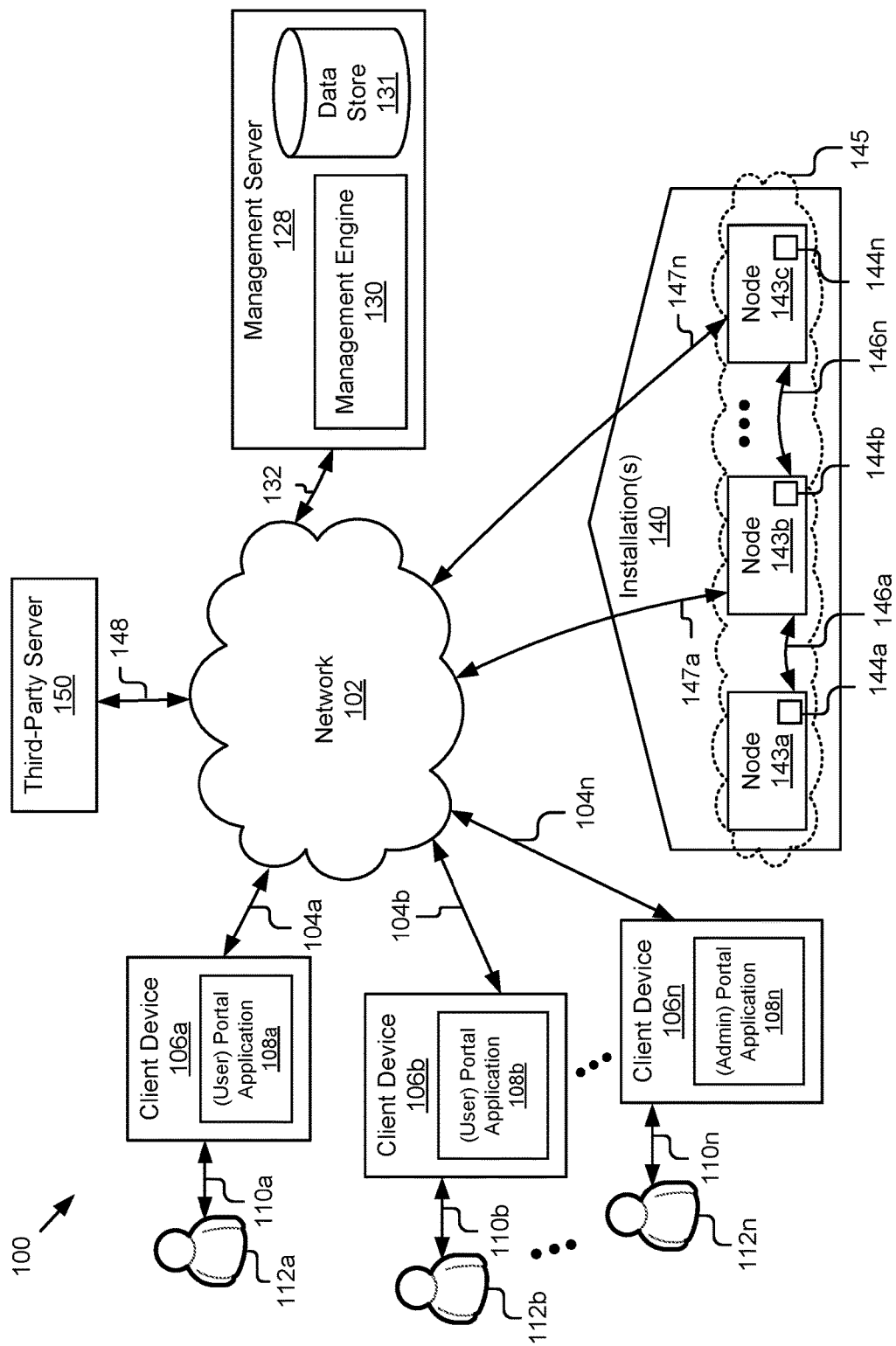
FIG. 1 is a block diagram of an example meeting scheduling system.

The inventors have recognized that existing automatic scheduling systems are generally ineffective at helping the members of various organizations conduct effective and efficient meetings, whether virtual or in-person. For instance, for an in-person meeting, these solutions often provide little information about what meeting locations are available. As such, these solutions are unable to dynamically recommend the most effective room available for a meeting based on the location and requirements of its attendees, technological capabilities, or other factors. Further, due to the lack of real-time information about the rooms and/or their capabilities, the in-room technology is often ineffective, cumbersome, unavailable, or does not work at all, and the meeting is at risk of being inconveniently located.

The inventors have recognized that, even more, existing automatic scheduling systems are unable to dynamically suggest, or learn over time, an optimal attendee mix for a meeting. Organizations lose a significant amount of employee productivity year-to-year due to redundant attendance at meetings. For instance, these solutions are unable to dynamically identify what number and which attendees constitute the optimal number during the scheduling of a meeting. They are also unable to automatically generate and provide actionable insights to stakeholders on performing more efficient meetings, learn from previous insights adopted to further generate even more targeted or effective insights, etc.

The specification overcomes the deficiencies and limitations of existing automatic scheduling systems at least in part by dynamically determining and/or learning meeting redundancy based on user attributes associated with the user identifier of attendees associated with the meeting.

According to one innovative aspect of the subject matter described in this disclosure, a system includes one or more computer processors and one or more memories storing instructions that when executed by the one or more processors, cause the system to perform operations including: retrieving user IDs of meeting attendees, retrieving one or more characteristics associated with the user IDs, retrieving a rule having one or more parameters for scoring meeting composition, comparing the one or more characteristics associated with the user IDs based on the one or more parameters of the rule, and generating a meeting score based on the comparison.

In general, another innovative aspect of the subject matter described in this disclosure may be embodied in methods that include retrieving, using one or more processors, user IDs of meeting attendees; retrieving, using the one or more processors, one or more characteristics associated with the user IDs; retrieving, using the one or more processors, a rule having one or more parameters for scoring meeting composition; comparing, using the one or more processors, the one or more characteristics associated with the user IDs based on the one or more parameters of the rule; and generating, using the one or more processors, a meeting score based on the comparison.

In general, another innovative aspect of this subject matter described in this disclosure may be embodied in methods that include exposing, at a first computing system, access via a computer network to a scheduling application program interface (API) for scheduling meetings; receiving, at the server system via the computer network, a meeting request from a second computing system associated with a meeting organizer via the API, the meeting request being a request to schedule a meeting at a particular time and place; scheduling, using the one or more processors, a meeting based on the meeting request by at least storing a corresponding data entry in a meeting data store; tracking, using the one or more processors, attendance confirmation transmitted via the computer network from third computing systems associated with attendees of the meeting, the attendance confirmation including user IDs respectively associated with the attendees; retrieving, using the one or more processors, characteristics associated with the user IDs from a user data store; determining, using the one or more processors, a meeting purpose; retrieving, using the one or more processors, a rule having one or more parameters for scoring meeting composition based on the meeting purpose; comparing, using the one or more processors, the characteristics associated with the user IDs using the one or more parameters of the rule from a rule data store; and generating, using the one or more processors, a meeting score composition based on the comparison.

In general, another innovative aspect of the subject matter described in this disclosure may be embodied in methods that include presenting, on a display of a first computing device, the graphical user interface to schedule the meeting; receiving, using one or more processors, a meeting request input using the graphical user interface, the meeting request including a date, a location, a meeting topic, and a plurality of invitees; determining, using the one or more processors, an objective of the meeting based on the meeting topic; retrieving, using the one or more processors, a rule having one or more parameters for scoring meeting composition; comparing, using the one or more processors, the plurality of invitees with the rule; identifying, using the one or more processors, a redundant invitee included in the plurality of invitees in response to the comparison indicating that the redundant invitee exceeds a threshold of the rule; presenting, in the graphical user interface, a redundancy indication that the redundant invitee has been included in the meeting request; updating, using the one or more processors, the plurality of invitees by removing the redundant invitee from the plurality of invitees; comparing, using the one or more processors, the updated plurality of invitees with the rule; presenting, in the graphical user interface, an approved indication that the meeting request does not include redundant invitees; and sending, using the one or more processors, invitations to the updated plurality of invitees.

Other aspects include corresponding methods, systems, apparatus, and computer program products for these and other innovative aspects.

These and other implementations may each optionally include one or more of the following features and/or operations. For instance, the features and/or operations include: determining, using the one or more processors, whether a quantity of similar domain categories exceeds the predetermined parameter; identifying, using the one or more processors, a meeting objective included in the meeting request; determining, using the one or more processors, a rule related to the objective; comparing, using the one or more processors, the meeting score composition to a previously generated meeting score composition; determining, using the one or more processors, an insight based on the comparison; wherein the insight is one of a cost, a frequency, and a domain; identifying, using the one or more processors, redundant user IDs included in the meeting using the meeting score composition; providing, in a graphical user interface of the second computing system, an indication of the identified redundant user IDs included in the meeting; providing, in graphical user interfaces of the third computing systems, an opt-out function to one or more users associated with the redundant user IDs; and providing, using the one or more processors, an opt-out function to one or more users associated with the redundant user IDs.

The technology disclosed herein is particularly advantageous in a number of respects. For instance, a user scheduling a meeting may be provided indications of redundant invitees and adapt the meeting composition based on the indications of redundant invitees. In another example, redundancy insights may be autonomously generated and provided to a company or organization. It should be understood that the foregoing advantages are provided by way of example and that the technology may have numerous other advantages and benefits. Further, it should be understood that the Summary describes various example aspects of the subject matter of this disclosure and is not intended to encompass every inventive aspect.

The technology disclosed in this application can, for a given meeting, dynamically determine and/or learn meeting redundancy based on user attributes associated with the user identifier of attendees associated with the meeting. An attendee may describe a person invited to a meeting (prospective attendee) or a person that actually attended the meeting. In some implementations, an attendee may be referred to as an invitee when the attendee has been invited to a meeting but has not yet attended. Attributes of each attendee may be stored and maintained in a user profile unique to that attendee, as discussed in further detail below. A user identifier may be a user id or handle, an e-mail, a unique number, or another unique identifier.

A meeting is embodied by an entry in a data store specifying a meeting id, time, place, medium, and attendee identifiers of the corresponding attendees of the meeting. A meeting and the meeting entry are often used interchangeably in this document for convenience. The meeting medium may be a physical location (e.g., a conference room, etc.) or virtual location (e.g., a phone number, online meeting, etc.). In some embodiments, the physical locations may be cataloged along with their capabilities as discussed in further detail below.

The technology may include a meeting scheduling system, such as the example system 100 shown in FIG. 1. The meeting scheduling system 100 may including a plurality of networked end-points coupled by a network 102. For instance, the system 100 may include client devices 106*a*, 106*b*, . . . , 106*n* (also simply referred to individually and/or collectively as 106), a management server 128, installation(s) 140, and one or more third-party servers 150, which are communicatively coupled via a network 102 for interaction with one another.

The client devices 106*a* . . . 106*n* may respectively contain instances 108*a* . . . 108*n* of a portal application. For instance, client devices 108*a* and 108*b* are depicted as including user portals 108*a* and 108*b* (also referred to individually and collectively as simply 108), and the client device 108*n* is depicted as including an admin portal 108*n*, although it should be understood that any number of client devices 106 may include the user portal 108, the admin portal, or both. The portal application may be executable by a corresponding client device 106 to schedule meetings, view meeting analytics, configure the nodes 143 of a given installation 140, etc. The portal application 108 is discussed in further detail below.

The management server 128 may include a management engine 130 and a data store 131. The management engine may configure the management server 128 to schedule meetings in a meeting data store based on meeting requests received from endpoints of the system 100, such as the client devices 106, manage the scheduled meetings, generate and provide meeting recommendations based on the meeting data processed by it, generate and provide meeting redundancy analytics based on the meeting data aggregated by it, machine learn optimal meeting composition, etc. In addition, the management engine 130 may provide installation management, visitor registration, and location scheduling (e.g., data, APIs, interfaces, etc.) to various endpoints in the system 100, such as the client devices 106 and the nodes 143. The management server 128 is discussed in further detail below.

The data store 131 may store related data such as records backing the various services provided by the management engine 130. Example data may include meetings, users data, organizational data (e.g., human resource management system (HRMS) data, room data, redundancy rules, event information, visitor logs, installation records including setup and configuration changes, encryption keys for installation nodes 143, user and business accounts, etc., as discussed further below.

An installation 140 may be installed in a given complex, such as a building or group of buildings, although other structure and/or location types also apply, and may include multiple nodes 143*a*, 143*b*, . . . , 143*n* (also individually and/or collectively referred to herein as 143), respectively equipped with schedulers 144*a*, 144*b*, . . . , 144*n* (also individually and/or collectively referred to herein as 144) proximate to corresponding meeting locations (e.g., conference rooms) in the complex. Each scheduler 144 may be keyed to a given physical location in the complex and provides users with the ability to conveniently reserve that particular location for an event, such as a meeting. Additionally, users can utilize software applications, such as the portal application 108, on their mobile or desktop computing devices to reserve various locations through a user interface provided by the scheduler 144. Each installation 140 may be coupled to the network 102 for communication with other endpoints.

Figure 2:
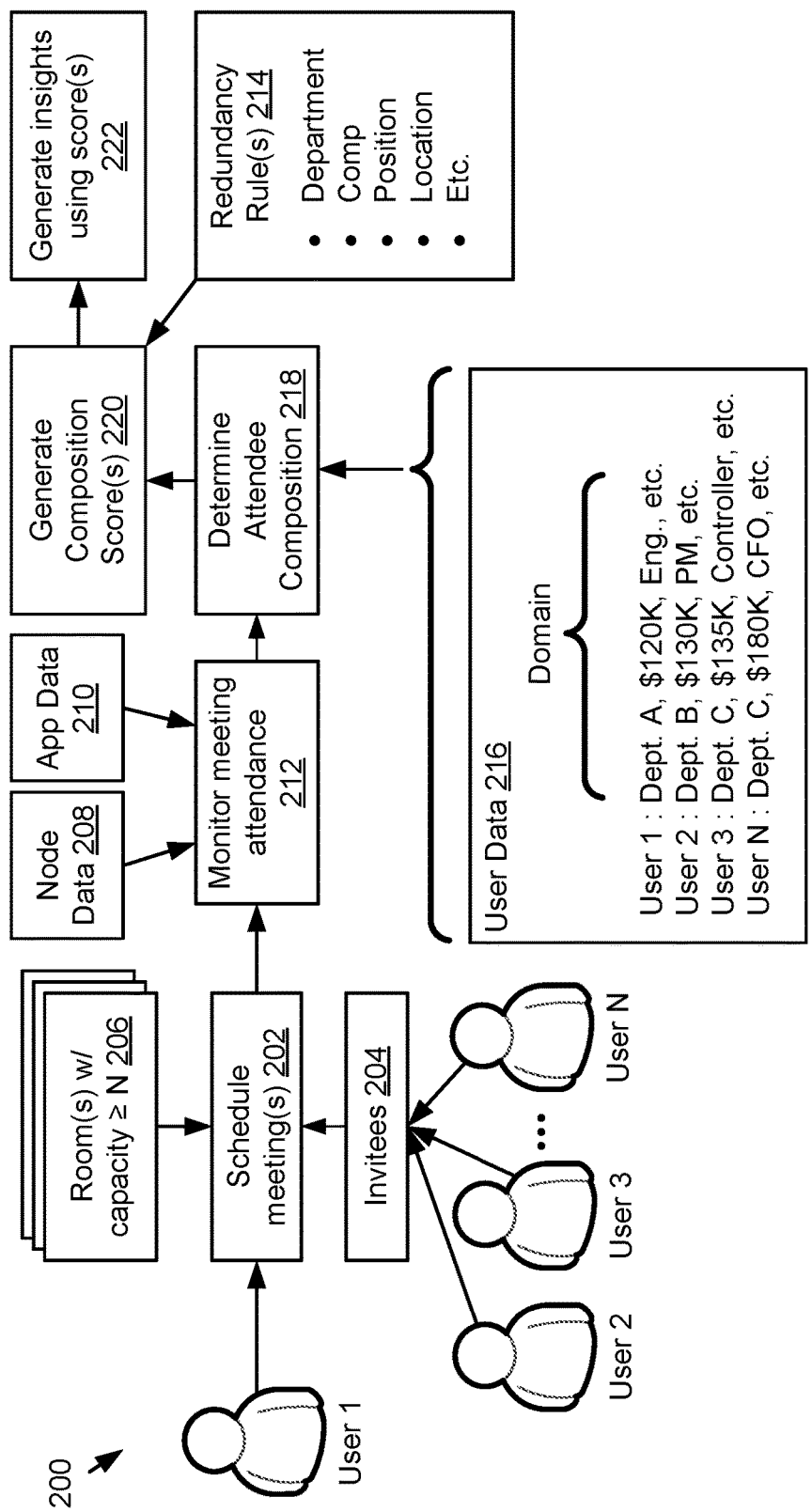
FIG. 2 is a block diagram of an example data flow between meeting scheduling system elements.

FIG. 2 is a block diagram of an example data flow 200 between meeting scheduling components of the system 100. It should be understood that this data flow 200 is provided to illustrate an example of how the system 100 may operate, and is not intended to be limiting or all-inclusive. Further implementations are discussed throughout this disclosure, and/or would be apparent based on and encompassed by the teachings of this disclosure.

At block 202, user 1 may submit a meeting scheduling request (to schedule a meeting) using an instance of the portal application 108, and the management engine 130 may schedule the meeting based on the request. The user 1 may be a user 112 as depicted in FIG. 1. In some implementations, the scheduling request may specify different meeting characteristics including a date, a time, a location, equipment, attendees, meeting topic, meeting notes, etc., which may be input by the user 1 using a corresponding meeting scheduling interface of the portal application 108.

At block 204, using information input during creation of the meeting request, the management engine 130 may retrieve data describing the invitees of the meeting. In some implementations, the invitees may include any number of users (e.g., user 2-user N). The meeting request may include unique identifiers for the invitees (e.g., email addresses), and the management engine 130 may utilize the unique identifiers to retrieve information about the attendees in block 202. In some instances, the management engine 130 may provide user information to the portal application 108 during the creation of the meeting request. For instance, the invitee information may be exchanged between the user application 108 and the management engine 130 asynchronously (e.g., using a structured data set format (e.g., such as JSON) and a data request method (e.g., HTTP(S) GET or POST). In some instances, the user information may include recommendations for which users to include and/or eliminate from the attendee list, as discussed in further detail below.

At block 206, the management engine 130 may retrieve room data about available rooms for the meeting (e.g., based on time and/or date information, attendee information, etc., input by user 1). In some instances, the management engine 130 may responsively identify the working locations of the attendees by querying the user data associated with those attendees stored in the data store 131, determine rooms that are available for the time/date of the meeting and that satisfy the other meeting criteria (e.g., having the requisite capacity to fit the attendees (e.g., capacity greater than or equal to the number of attendees), satisfying the technology requirements of the meeting, etc.), and filter out meeting rooms with locations incompatible with the locations of the attendees, and sort the remaining meeting rooms based on proximity to the attendees, which may be averaged if the attendees are distributed across a given complex. In some implementations, the room information in block 206 may be provided by the management engine 130 responsive to receiving a request for room information from user 1 via the portal application 108, such as during the creation of a meeting scheduling request. For instance, the room information may be exchanged between the user application 108 and the management engine 130 asynchronously (e.g., using a structured data set format (e.g., such as JSON) and a data request method (e.g., HTTP(S) GET or POST).

Upon finalization and/or submission of the meeting request, the management engine 130 may store an entry embodying the meeting in the data store 131 and generate and send electronic meeting invitations (e.g., messages including electronic calendar invitations) to the one or more attendees. The management engine 130 may be configured to process electronic confirmation messages from the attendees indicating actual or tentative attendance at the meeting, or rejecting the invitation.

In some implementations, a meeting entry may be rescored and/or attendee recommendations updated as the management engine 130 receives input responsive to electronic meeting invitations being sent to the electronic addresses of a first set of attendees. For example, one or more attendees may, by providing input via an invitation acceptance interface, reject the invitation to the meeting, and the scheduling engine 324 may generate and send an electronic notification to the electronic address of a meeting organizer notifying the organizer of the rejection and including content suggesting replacement attendees. The replacement attendees may, in some cases, have been user IDs excluded from the electronic meeting invitations as being redundant based on the meeting composition scores. In other cases, the analytics engine 326 and/or the scheduling engine 324 may analyze the organization data for one or more individuals with attributes (e.g., domain, department, seniority level, etc.) matching those of the individuals that declined the meeting, and may generate recommendations(s) based on the matches. Other variations are also possible and contemplated.

At block 212, the management engine 130 may monitor attendance of the meeting by attendees. Attendance may be monitored using a number of different electronic information sources, such as node data 208 received from nodes 143, app data 210 received from portal applications 108, etc. Attendance monitoring may be performed before the meeting or as the meeting occurs. Attendees may be tracked by unique identifier as discussed elsewhere herein.

As an example, electronic meeting invitations may be accepted using a client device, node, or implicitly via a beacon. For instance, invitees can, using a corresponding graphical user interface, take one of four actions (e.g., accept, decline, tentatively accept, or never respond in any fashion). Other variations are also possible and contemplated, such as those discussed below.

Attendance confirmations provided by each different electronic information source may be weighted differently by the management engine 130 based on information source type, geolocation, timestamp of confirmation, etc. The attendance weighting may reflect the perceived reliability of the attendance confirmation. For instance, calendar confirmations submitted by attendees responsive to receiving an electronic invitations to the meeting may be afforded a moderate weight (e.g., using a scalar weighting procedure (e.g., 0-1 with 1 being the highest)) because the corresponding attendees have taken affirmative steps to confirm their attendance. However, it is possible that one or more of those attendees may not end up attending, so a higher weight may be withheld in some cases.

For example, a node 143 may be a dedicated scheduling panel (e.g., specially configured touch-screen tablet computer) located proximate an entrance of the meeting room and an attendee may confirm attendance at the start of the meeting by inputting confirmation by tapping on the screen of the panel). The management engine 130 may afford a high or highest weight (e.g., using a scalar weighting procedure) to the attendance confirmation for that attendee since it is highly probable the attendee is in attendance.

In a further example, the meeting room may be equipped with a beacon configured to wirelessly sense the portable electronic devices of the attendees in attendance (e.g., mobile phones, wearables, etc.), and may transmit presence data to the management engine 130 via the network 102 indicating the presence of those users in the meeting room. The management engine 130 may correlate that presence data with the meeting entry and confirm attendance of those attendees automatically. In this example, data associating the portable electronic devices and the users may be pre-stored and accessible by the management engine 130 to confirm the identities of those users/attendees. In this example, the management engine 130 may afford the highest weight (e.g., using a scalar weighting procedure) to attendance confirmations for those attendees because their presence was independently detected by the beacon.

Other weighting variations are also possible and contemplated, and are other variations for determining meeting location occupancy and/or occupancy levels are contemplated. For example, a meeting location may be equipped with general motion sensor(s), which are configured to sense the general occupancy of a room based on the number of objects sensed relative to the size of the room. The management engine 130 can estimate the number of attendees based on the occupancy signals received from the motion sensor(s). The occupancy can also be used by the management engine 130 to determine if a group of individuals substantially smaller than a meeting room's capacity (e.g., 25%+) consistently uses a given meeting location, thus leading to underutilization of the location. The management engine 130 can automatically generate and provide a recommendation of a suitable room to one or more of the user IDs of the users meeting in that room by querying the data store 131 for a room that meets the requirements of that group of individuals, such as location, size, technological requirements, etc.

In another example, the management engine 130 may receive data from Wi-Fi™ access point(s) installed at or immediately proximate the meeting location to confirm invitee attendance at the meeting location. Invitee's mobile devices may include active Wi-Fi™ transceivers that broadcast unique device-identifying information. The management engine 130 may receive data including the broadcasted data and/or data derived therefrom and generate attendance data reflecting the unique endpoints within the meeting location and estimating attendance for a meeting in that location. The attendance data may in some cases reflect a live attendance map for a meeting and indicate when users arrive and/or leave the meeting. The attendance data may also include data usage information capture user activity during the meeting, which can be used to determine engagement in the meeting by users (e.g., are users surfing social media channels, consuming data relevant to the meeting, not consuming data during the meeting, etc.

In some cases, attendance data describing whether people are in a given meeting location, and/or the number of individuals that are in that location, may be accessible from third-party data sources using an exposed API.

In further examples, an electronic notification (e.g., email, mobile device notification, text, etc.) may be transmitted by the management engine 130 to electronic addresses of the attendees after a meeting inquiring of they actually attended. The management engine 130 may aggregate the responses to these notifications to determine attendance. At block 218, the monitoring engine 130 may determine an attendee composition for the meeting using the monitored meeting attendance using the user data 216 of the attendees. Attendee composition may range from homogenous to heterogeneous depending on meeting purpose and diversity of the attendees. The user data 216 may be accessed using the user identifiers of the attendees. The user data 216 may include a domain for each attendee.

The domain(s) of each attendee describes one or more attributes of that attendee. In some instances, a given domain may encapsulate multiple attributes of that attendees. Example domain attributes include a department, a salary/cost, a position, a job title, a hierarchy relationship, etc. Attendee composition may be embodied, at least in part, by the domains of the respective attendees.

In some embodiments, the management engine 130 may dynamically determine a domain for a user. In other words, a domain may be fluid, and the redundancy scoring may be dependent on precedence. Because a domain may encompasses numerous different user attributes in some cases, the management engine 130 evaluates user attributes for duplicates without precedence. For instance, an executive meeting at EventBoard may not be considered to have redundancy even though there may be duplicate "levels" within the organization in that meeting because there may be only one person from each team at the meeting.

In some embodiments, a user's domain may evolve as additional data is aggregated about a user and/or the user's meeting patterns. For instance, a first user, Ron Ross, may attend meetings frequently with a second user, Brian Bond, as reflecting in the meeting data stored in the data store 131. As a result, even though these users may be on different teams, both their presence may not be required in a meeting with a certain objective (e.g., meeting about pricing). For instance, over time the management engine 130 may learn, based on response data received from electronic addresses uniquely associated with Brian Bond, that Brian Bond did not need to attend certain meetings with a given objective (e.g., meetings about pricing), then the management engine 130 may, in the same or substantially circumstances (e.g., meetings about cost), detect redundancy between Ron Ross and Brian Bond for a related meeting entry being created. Additionally or alternative, the management engine 130 may correlate the meeting rejections or non-attendance with certain meeting attributes, such as meetings run by a certain user ID or about certain topics (e.g., based on the estimation that Brian Bond feels the meeting are poorly run and/or a waste of time).

At block 220, the management engine 130 may generate a meeting composition score reflecting a level of attendee redundancy based on an applicable redundancy rule 214. In some implementations, the management engine 130 may retrieve the rule 214 based on a predetermined objective for the meeting, as discussed in further detail below.

The management engine 130 may compare the parameters of the redundancy rule to the composition of the attendees, and calculate a score based on the comparison. For example, a rule 214 may specify a desired domain or domain distribution for the attendees of the meeting, and the management engine 130 may evaluate the domains of the attendees based on the specified domain parameter(s) of the rule, and generate a score reflecting how closely the attendee domains match the specified domain parameter(s).

At block 222, the management engine 130 may generate insight(s) about the attendee composition using the composition score, as discussed further below. In some implementations, insight(s) may be information related to which attendees are determined to be redundant based on the redundancy rule parameter(s). In further implementations, the insights may be generated by analyzing compositions scores over a period of time. Other variations are also possible and contemplated.

Referring again to the example system 100 in FIG. 1, the network 102 may include any number of networks and/or network types. For example, the network 102 may include, but is not limited to, one or more local area networks (LANs), wide area networks (WANs) (e.g., the Internet), virtual private networks (VPNs), mobile (cellular) networks (3G, 4G, 5G, etc.), wireless wide area network (WWANs), WiMAX® networks, and/or other suitable interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The client devices 106 are computing devices having data processing and communication capabilities. The client devices 106 may couple to and communicate with one another and the other entities of the system 100 via the network 102 using a wireless and/or wired connection. The client devices 106a, 106b, . . . , 106n may be respectively coupled to the network 102 via signal lines 104a, 104b, . . . , 104n and may be accessible by users 112a, 112b, . . . , 112n (also referred to individually and collectively as 112) as illustrated by lines 110a, 110b, . . . , 110n. Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While three or more client devices 106 are depicted in FIG. 1, the system 100 may include any number of client devices 106. In addition, the client devices 106 may be the same or different types of computing devices.

The user portal 108 and the admin portal 108 may in some cases be different due to the different access levels of the users 112. For instance, the users 112a and 112b may be granted a consumer access level allowing those users to modify bookings of different locations within the installation(s) they are associated within the data store 131, and the user 112n may be granted an administrator access level permitting the user 112n to configure an installation, view various analytics, etc. For instance, the user 112n can use the admin portal 108n to setup, configure, and remove nodes 143, adjust node settings, view insights and analytics, etc. In some cases, the user 112n also has the same privileges as the users 112a and 112b, and may use the admin portal 108 to perform the same acts as the user portal 108.

The user and/or admin portal applications 108 may be storable in a memory (e.g., see FIG. 3) and executable by a processor (e.g., see FIG. 3) to provide for user interaction, receive user input, present dynamic information to the user via a display (e.g., see FIG. 3), send data to and receive data from the other entities of the system 100 via the network 102, such as the management server 128, etc. The user and admin portal applications 108 may generate and present various user interfaces to perform the acts and/or functionality described herein. The interfaces may in some cases be based at least in part on information received from the management server 128 via the network 102 and/or information retrieved from local data storage.

In some implementations, the admin portal application 108 is an enhanced version of the user portal application 108 that includes administrator functions. In some implementations, the user portal application 108 and the admin portal application 108 variation are separate applications. The user and admin portal applications 108 may distributed applications, such as a web site accessible via a browser, application accessible via a browser, apps downloaded from an application marketplace (e.g., Apple Inc.'s App Store[SM]), native applications, a combination of the foregoing, etc., all operable by the respective client devices 106. In some cases, the user portal 108 may be embodied by a software extension to an existing application, such as an e-mail or calendar application (e.g., Microsoft Outlook™).

The management server 128 may include one or more computing devices having data processing, storing, and communication capabilities. For example, the management server 128 may include one or more hardware servers, virtual servers, server arrays, storage devices and/or systems, etc., and/or may be centralized or distributed/cloud-based. In some implementations, the management server 128 may include one or more virtual servers, which operate in a host server environment and access the physical hardware of the host server including, for example, a processor, memory, storage, network interfaces, etc., via an abstraction layer (e.g., a virtual machine manager). The management server 128 may be coupled to the network 102 via signal line 132.

In some implementations, the user and/or admin portal 108, the management engine 130, and the scheduler 144 may require users 112 to be registered to access the functionality provided by them. For example, they may require a user to authenticate his/her identity (e.g., by confirming a valid electronic address). In some instances, these entities 108, 118, 124, and/or 130 may interact with a federated identity server (not shown) to register/authenticate users. Once registered, these entities 108, 118, 124, and/or 130 may require a user seeking access to authenticate by inputting credentials in an associated user interface.

The nodes 143 are computing devices having data processing and wireless data communication capabilities, such as a tablet computer (e.g., Apple Inc.'s iPad®). As discussed elsewhere herein, the nodes 143 are capable of connecting to the network 102 when available to exchange data with other entities of the system, such as the management server 128.

The nodes 143 are also capable of connecting together (as reflected by signal lines 146a . . . 146n to form a mesh network of peer nodes 143, such the mesh network 145 depicted in FIG. 1. Thus, the mesh network 145 comprises the nodes 143a, 143b, . . . 143n of the installation 140. The connectivity framework of the mesh network 145 may utilize a combination of networking protocols, such as personal area network (PAN) protocols (e.g., Bluetooth®) and/or WLAN protocols (e.g., Wi-Fi™), to allow the nodes 143 of the mesh network 145 to exchange information about the services they provide, such as connectivity data. While three or more nodes 143 are depicted as forming a mesh network 145 in FIG. 1, in practice, any number of nodes may be utilized.

It should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc. In addition, while the system 100 provides an example of an applicable computing architecture, it should be understood that any suitable computing architecture, whether local, distributed, or both, may be utilized in the system 100.

The third-party server 150 has data processing, storing, and communication capabilities. For example, the third-party server 150 may include one or more hardware servers, server arrays, storage devices and/or systems, etc. In some implementations, third-party server 150 may include one or more virtual servers, which operate in a host server environment. In some implementations, the third-party server 150 can host services such as a third-party FIRMS application (e.g., Zenefits™). Alternatively, the FIRMS services may be incorporated into the services provided by the management server 128.

The management engine 130 may access the computing services provided by the third-party application of the third-party server 150, such as the FIRMS application, using application programing interfaces (APIs) exposed by the third-party platform. In typical cases, the APIs are accessible using standardized access protocols (e.g., SOAP, REST, CORBA, ICE, etc.). These APIs include software methods for accessing the various functionality of the applications, as well as data retrieval methods for accessing information about the APIs, objects, object types, and other aspects of the applications. The APIs generally require the management application 130 (or an administrator of the application) to have the requisite permission and authenticate using standard authentication routines (OpenID, OAuth, various proprietary authorization protocols, etc.).

Figure 3:
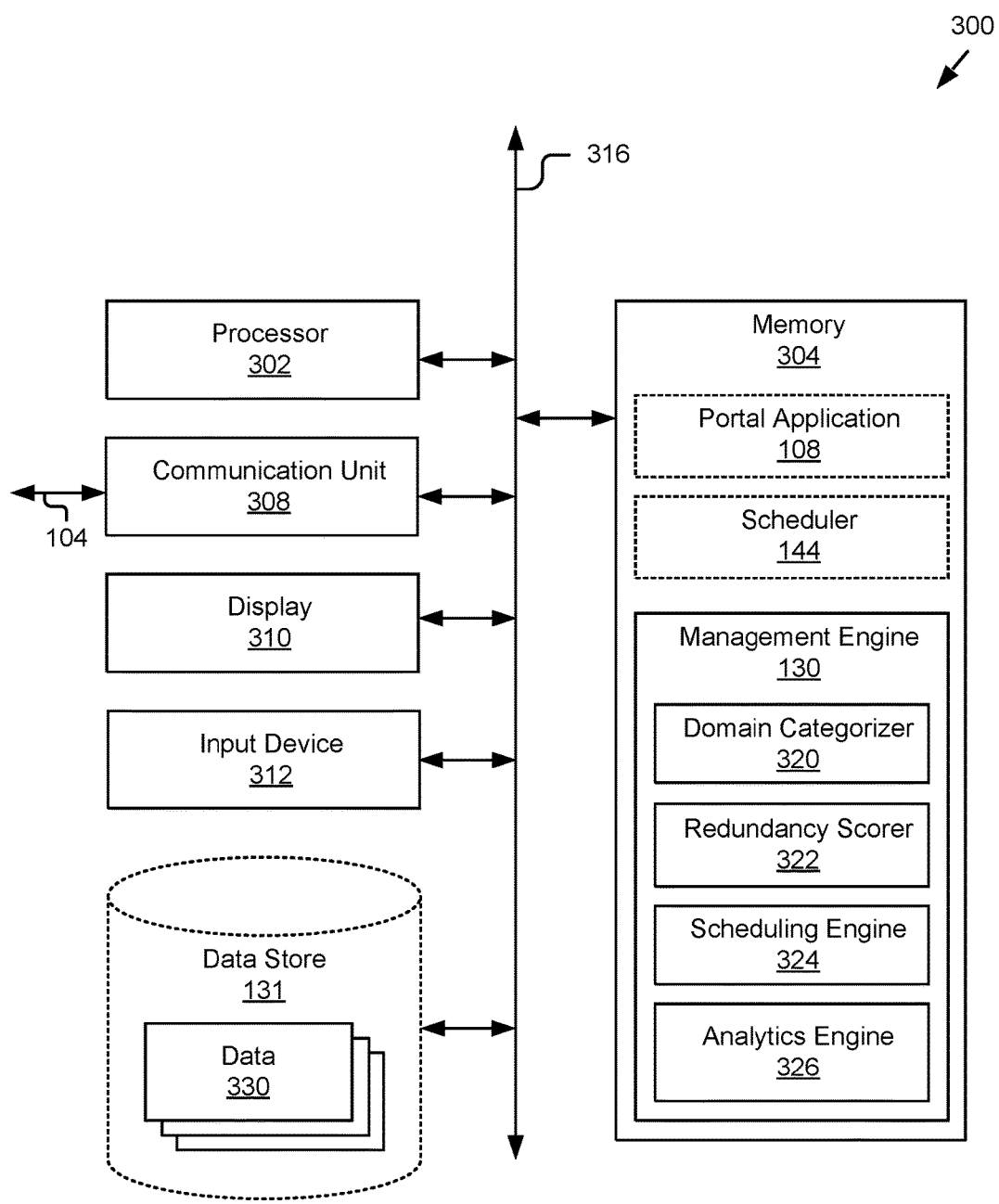
FIG. 3 is a block diagram of an example computing device.

FIG. 3 is a block diagram of an example computing device 300, which may represent aspects of a node 143, a client device 106, a management server 128, or a third-party server 150. The computing system 300, as depicted in FIG. 3, may include a processor 302, a memory 304, and a communication unit 308. In some configurations, the computer system 300 may also include a display 310, and an input device 312. The components of the computing device 300 may be communicatively coupled by a communications bus 316. In some implementations, the computing device 300 may embody the management server 128, and further include the data store 131 and the management engine 130 stored in the memory 304 and executable by the processor 302. In some implementations, the computing device 300 may embody a node 143 and include the scheduler 144 of the management engine 130 stored in the memory 304 and executable by the processor 302. In some implementations, the computing device 300 may embody a client device 106 and include the portal application 108 (e.g., user and/or admin) stored in the memory 304 and executable by the processor 302. Numerous further implementations are also possible, such as where the node 143 may include the portal application 108 (e.g., providing certain users configuration capabilities).

The computing device 300 depicted in FIG. 3 is provided by way of example and it should be understood that they may take other forms and include additional or fewer components without departing from the scope of the present disclosure. For example, while not shown, the computing system 300 may include various additional input and output devices, various operating systems, sensors, additional processors, software programs, and other physical configurations.

The processor 302 may execute software instructions by performing various input/output, logical, and/or mathematical operations. The processor 302 have various computing architectures to process data signals including, for example, a complex instruction set computer (CISC) architecture, a reduced instruction set computer (RISC) architecture, and/or an architecture implementing a combination of instruction sets. The processor 302 may be physical and/or virtual, and may include a single core or plurality of processing units and/or cores. In some implementations, the processor 302 may be capable of generating and providing electronic display signals to a display device, supporting the display of images, capturing and transmitting images, performing complex tasks including various types of feature extraction and sampling, etc. In some implementations, the processor 302 may be coupled to the memory 304 via the bus 316 to access data and instructions therefrom and store data therein.

The memory 304 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 302. In some implementations, the memory 304 may include one or more of volatile memory and non-volatile memory. For example, the memory 304 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray', etc.). It should be understood that the memory 304 may be a single device or may include multiple types of devices and configurations.

The memory 304 may store and provide access to data to the other components of the computing device 300. In some implementations, the memory 304 may store instructions and/or data that may be executed by the processor 302. For example, as depicted, the memory 304 may store the portal application 108, and/or the management engine 130, which may include one or more of the domain categorizer 320, the redundancy scorer 322, and/or the scheduling engine 324. In a further example, the memory 304 may store an HRMS engine for providing an HRMS platform. The memory 304 is also capable in various implementations of storing other instructions and data, including, for example, an operating system, hardware drivers, other software applications, databases, etc. The memory 304 may be coupled to the bus 316 for communication with the processor 302 and the various other components depicted in FIG. 3.

The bus 316 can include a communication bus for transferring data between components of a computing device or between computing devices, a network bus system including the network 102 or portions thereof, a processor mesh, a combination thereof, etc. In some implementations, the components of the system 100 may cooperate and communicate via a software communication mechanism implemented in association with the bus 316. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 308 may include one or more interface devices (I/F) for wired and/or wireless connectivity with the network 102 and/or other computing devices. For instance, depending on the implementation, the communication unit 308 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. Depending on the implementation, the communication unit 308 may include radio transceivers (4G, 3G, 2G, etc.) for communication with the mobile network 103, and radio transceivers for Wi-Fi™ and close-proximity/personal area (e.g., Bluetooth®, NFC, etc.) connectivity, geo-location transceivers (e.g., GPS) for receiving and providing location information for the corresponding device, and the like. The communication unit 308 can provide other connections to the network 102 and to other entities of the system 100 using various standard network communication protocols, including, for example, those discussed elsewhere herein.

The data store 131 is an information source for storing and providing access to data 330. In some implementations, the data store 131 may be coupled to the management engine 130 to receive and provide access to data 330. In some implementations, the data store 131 may store data 330 received from other elements of the system 100 include, for example, the scheduler 144, the portal application 108, an HRMS platform hosted by the third-party server 150, etc. Examples of the types of data stored by the data store 131 are discussed elsewhere herein.

The data store 131 may be included in the computing device 300 or in another computing device and/or storage system distinct from but coupled to or accessible by the computing device 300. The data store 131 can include one or more non-transitory computer-readable mediums for storing the data 330. In some implementations, the data store 131 may be incorporated with the memory 304 or may be distinct therefrom. In some implementations, the data store 131 may include a database management system (DBMS) operable on the computing device 300. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The display 310 may display electronic images and data output by the client device 108 for presentation to a user 112. The display 310 may include any conventional display device, monitor or screen, including, for example, an organic light-emitting diode (OLED) display, a liquid crystal display (LCD), etc. In some implementations (e.g., an example implementation of the node 143), the display 310 may be a touch-screen display capable of receiving input from one or more fingers of a user 112.

The input device 312 may include any device for inputting information into the client device 106. In some implementations, the input device 312 may include one or more peripheral devices. For example, the input device 312 may include a keyboard (e.g., a QWERTY keyboard), a pointing device (e.g., a mouse or touchpad), microphone, an image/video capture device (e.g., camera), etc. In some implementations (e.g., an example implementation of the node 143), the structure and/or functionality of the input device 312 and the display 310 may be integrated, and a user of the client device 106 may interact with the client device 106 by contacting a surface of the display 310 using one or more fingers. In this example, the user could interact with an emulated (i.e., virtual or soft) keyboard displayed on the touch-screen display 310 by using fingers to contact the display in the keyboard regions.

The management engine 130, the portal application 108, and/or the scheduler 144 may include various sub-modules for performing various different acts, operations, and/or functions. The management engine 130, the portal application 108, and/or the scheduler 144, and/or their various sub-modules, may be coupled (e.g., via the processor 302) to one another and the other components of the computing device 300 (as applicable) for communication and interaction. In some implementations, the management engine 130, the portal application 108, and/or the scheduler 144, and/or their sub-modules, are sets of instructions executable by the processor 302 to provide their functionality. In some implementations, the management engine 130, the portal application 108, and/or the scheduler 144, and/or their sub-modules, are stored in the memory 304 of the computing device 300 (as applicable) and are accessible and executable by the processor 302 to provide their acts and/or functionality. In any of the foregoing implementations, the management engine 130, the portal application 108, and/or the scheduler 144, and/or their sub-modules, may be adapted for cooperation and communication with the processor 302 and other components of the computing device 300 (as applicable).

The scheduling engine 324 includes computer logic executable to serve responses to meeting requests received from various endpoints of the network, such as instances of the portal application 108 and the scheduler 144. The scheduling engine 324 may be coupled to the data store 131 to manipulate meeting data, room data, user data, redundancy data, etc., in performing its operations. In some implementations, the scheduling engine 324 may interact with (e.g., call various methods, instantiate objects of, etc.) the domain categorizer 320 and the redundancy scorer 322 in performing its operations. The scheduling engine 324 may receive meeting requests, process and store the requests, flag rooms as reserved based on the requests, generate electronic invitation messages and send them to the invitees based on the requests, receive and process electronic meeting acceptance responses, etc.

The domain categorizer 320 includes computer logic executable determine domains for users based on user data. The domain categorizer 320 may be configured to receive user-related information from other components of the system 100, such as an HRMS hosted by a third-party server 150, and merge that data with local user data, such as user profile data of users registered to use the scheduling aspects of the management engine.

The domain categorizer 320 may be configured to manipulate user-related data in the data store 131. In some implementations, the user-related data, such as proprietary user (e.g., employee) data, may be stored as structured data (e.g., tables) in the data store 131 and the domain categorizer 320 may perform one or more join operations to retrieve user requisite user attributes for determining one or more domains for a given user, as discussed further elsewhere herein.

In some implementations, the domain categorizer 320 may be configured to add one or more domain attribute to user profiles of users of the management engine 130. For example, the domain categorizer 320 may update user data (e.g., a user table by adding one or more domain value (e.g., category) to a domain column), may retrieve the domain value and provide the value to other components of the system 100, such as the redundancy scorer 322 and/or the scheduling engine 324, etc.

The redundancy scorer 322 includes computer logic executable to generate meeting composition scores based one user attributes of attendees of a meetings and redundancy rules 430. The redundancy scorer 322 may be coupled to the data store 131 to retrieve user data 410, redundancy rules 430, meeting data 440, and/or other data for computing a meeting composition score. The redundancy scorer 322 may store a meeting composition score in the data store in association with the meeting ID of a given meeting. The redundancy scorer may be configured to generate a redundancy score responsive to receiving a signal (e.g., method call) from another component of the system 100, such as the scheduling engine 324 or the analytics engine 326.

The analytics engine 326 includes computer logic executable to generate meeting analytics based on meeting composition scores. Meeting analytics may include meeting insights that may be provided to a stakeholder during the creation of a meeting or responsive to a meeting analytics request. The analytics engine 326 may store the analytics data in the data store 131. In some instances, the analytics data may be correlated with the meeting IDs and/or user IDs to which they pertain. For example, the analytics data of a given meeting may be stored in association with the meeting organizer's user ID, a meeting organizer's manager's user ID, the attendees' user IDs, etc., and applicable insights relevant to those user IDs may be generated and provided for consumption. In some instances, the analytics engine 326 may transmit the analytics data (e.g., as a structured data set (e.g., HTML, JSON, XML, etc.) to other components of the system 100, such as an instance of the portal application 108.

A meeting analytics request may be generated by an instance of the portal application 108. By way of example, a stakeholder, such as an executive reviewing meetings scheduled by subordinates during a certain period (e.g., over the past week, month, quarter, etc.), may open a meeting analytics dashboard via the portal application 108, and the portal application may generate and send a request to the management engine 130 to provide meeting analytics data for that period. In further examples, the meeting analytics request may be generated by the analysis engine 326 responsive to an internal event, such as a timer event (e.g., cron job, etc.) configured to trigger the generation and provision of the meeting analysis. Responsive to such a request, the analytics engine 326 may generate and send an electronic message (e.g., e-mail, text message, mobile notification, etc.) including the analytics, such as textual and graphical data (e.g., visualizations) embodying the analytics, an electronic link linking to a page renderable by the portal application 108 to display the analytics, etc.

The domain categorizer 320, the redundancy scorer, the scheduling engine 324, and the analytics engine 326 are discussed in further detail below.

Figure 4:
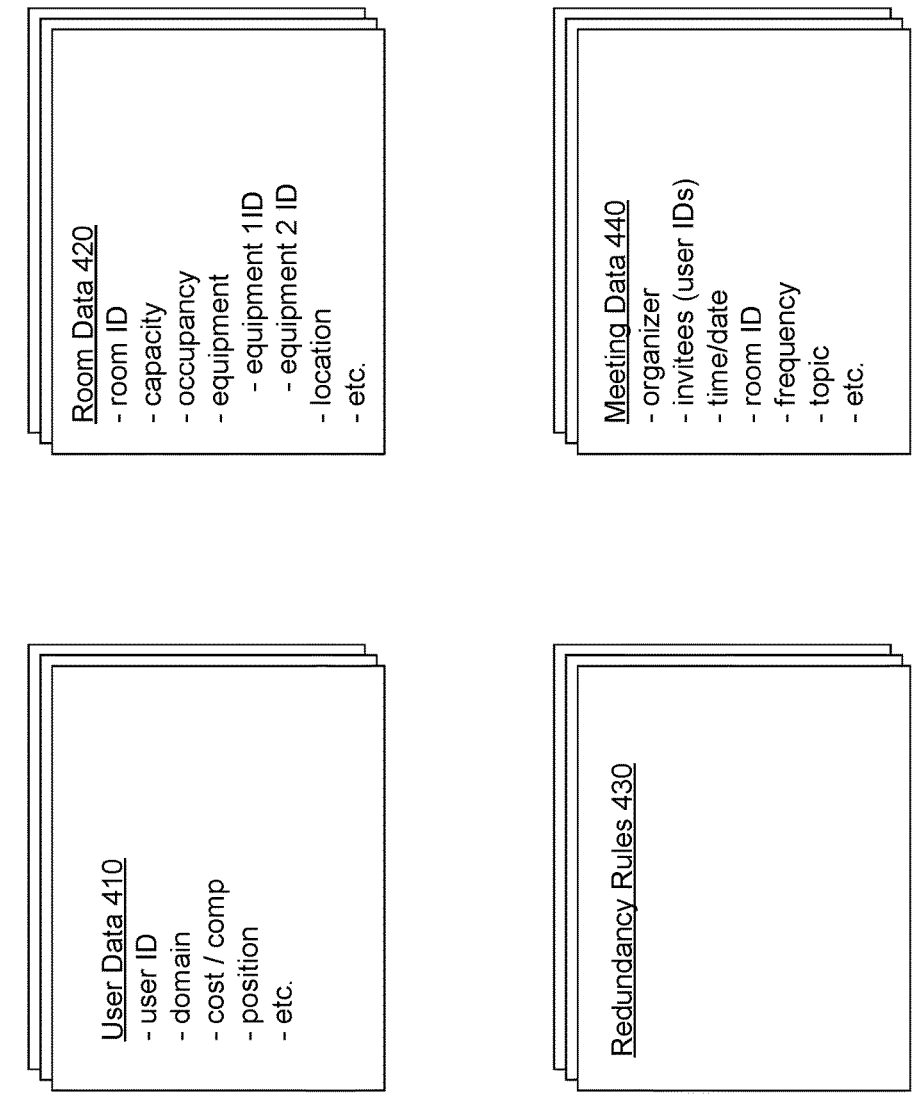
FIG. 4 is a block diagram of example data schemas.

FIG. 4 is a block diagram of example data schemas 400. As shown, the data store 131 may store user data 410, room data 420, redundancy rules 430, and meeting data 440. These data schemas are provided by way of example and it should be understood that additional or alternative data schemas may also be stored in the data store 131.

The user data 410 includes user profiles of each user of the system 100. Each user may be indexed using at least a unique user ID. A user's user profile may include one or more attributes characterizing the user, such as domains, cost to organization (e.g., compensation), position (e.g., title), relational information (seniority level relative to other users, IDs of direct reports, IDs of whom the user reports to, etc.), etc. The room data 420 includes room profiles of each room supported by the system 100. A room profile may be indexed by a room ID, and may include the attributes of the room, including capacity, occupancy (e.g., a flag indicating whether the room is currently occupied), equipment (IDs of equipment included in the room, operation status of equipment, dependencies, etc.), location (e.g., geolocation data, such as an address, geographical coordinates, etc.), etc. The redundancy rules 430 are discussed elsewhere herein. The meeting data 440 includes meeting entries for the meetings scheduled, monitored, and analyzed by the management engine 130. A meeting entry for a given meeting may include an organizer (e.g., user identifier of organizer), a list of invitees (user identifiers of invitees), time/date of the meeting, a room ID referencing a room profile, frequency of the meeting, a meeting topic or subject, etc.

Figure 5:
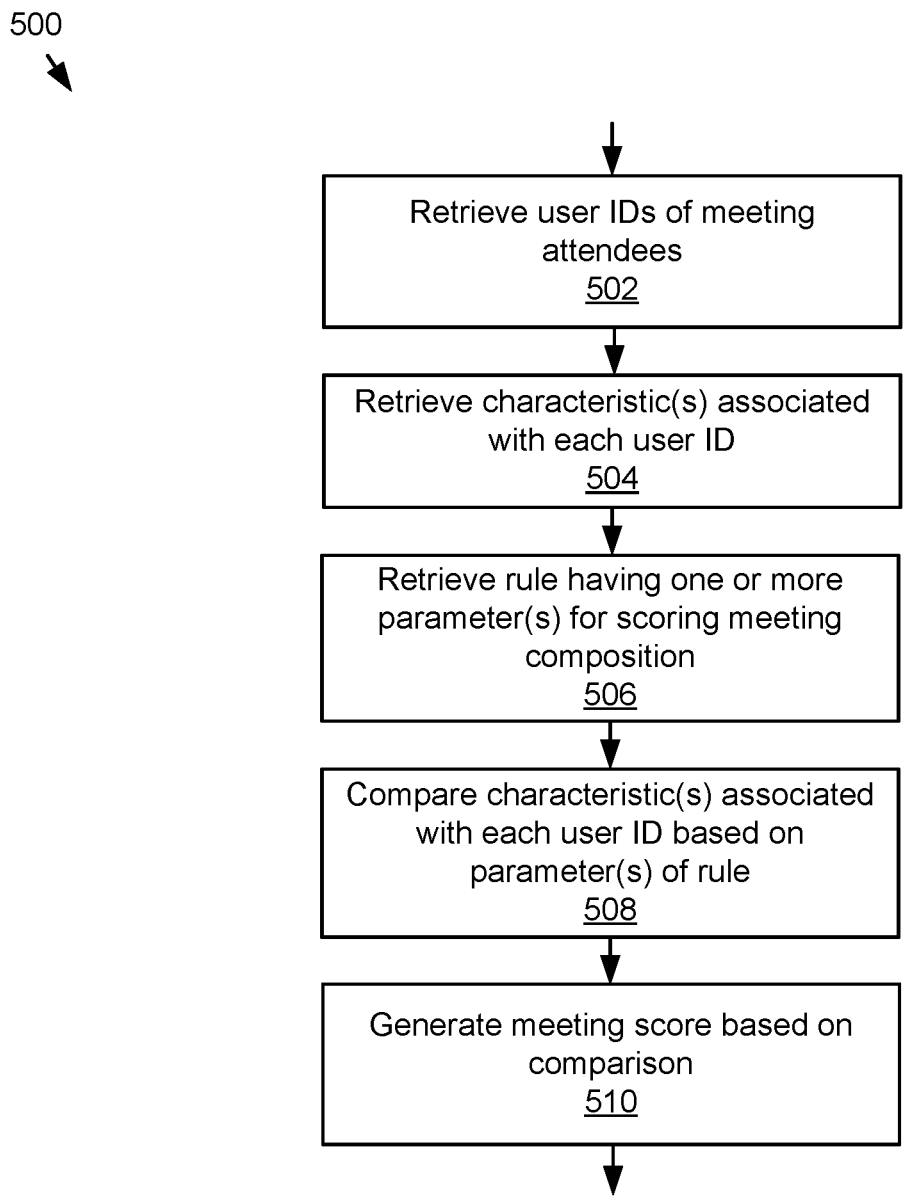
FIG. 5 is a flowchart of an example method for scoring meeting composition.

FIG. 5 is an example method 500 for generating a meeting score. At block 502, the scheduling engine 324 or redundancy scorer 322 retrieves user IDs of meeting attendees. In some implementations, the scheduling engine 324 may retrieve the user IDs of meeting attendees by parsing the user IDs of the invitees from a meeting request, in which case, the scheduling engine 324 may provide the user IDs to the radiance scorer 322 to use in scoring meeting composition. In some implementations, the redundancy scorer 322 may retrieve the attendee user IDs from the data store 131, etc. As an example, the user IDs of the attendees may be email addresses or other unique identifiers.

At block 504, the redundancy scorer 322 may retrieve characteristic(s) associated with each attendee user ID. The characteristics associated with each user ID may include domain(s) previously determined by the domain categorizer 320. For example, the redundancy scorer 322 may use the user IDs of the four meeting attendees to retrieve data describing the domain, of each attendee, a position of each attendee, a cost of each attendee, etc.

A domain may include and/or be based on attributes associated with the corresponding user. Example attributes may include department, cost to organization (e.g., salary, benefits, etc.), number of manager(s), identity of manager(s), position (e.g., title, seniority, etc.), hierarchal relationship to other users (e.g., such as attendees in meeting), etc.

In some implementations, a domain may include a combination of attributes and/or include relational information between different attributes, such as different domains or domain categories relevant to the user. The user characteristics of a given attendee user ID may be retrieved from user data, such as a user reference tables, stored in the data store 131. For instance, the user reference tables may include a user account table storing account information for using the management engine 130 (e.g., name, user ID, password, permissions, etc.), an employee information table storing human resource management-related information (e.g., company ID, department ID, domain, cost, position, manager ID(s), etc.), an organization table storing organization-related data (e.g., company ID, company description, department IDs, department descriptions, hierarchy of user IDs for each department ID, etc.), historical behavior data (e.g., interactions with other users, implicit meeting preferences, etc.), meeting preference (e.g., location preferences, technology preferences, meeting time preferences, etc.), and so forth.

At block 506, the redundancy scorer 322 retrieves a rule having one or more parameter(s) for scoring meeting composition. The rule may include parameter(s) for comparing attendees of a meeting to determine if any of attendees are redundant. In some implementations, the redundancy scorer 322 may retrieve a rule based on an objective of the meeting, as discussed elsewhere herein. In some implementations, the redundancy scorer 322 may retrieve a default rule or a rule learned by the management engine 130 for a certain organizer, department, or other segmentation. In some implementations, the rule may be user-selected (e.g., by an organizer or a stakeholder via an interface of the portal application 108).

The redundancy scorer 322 may retrieve the rule from the data store 131. In some implementations, the rules may be entered by an administrator or user. In further implementations, the redundancy scorer 322 may use decision-tree or other suitable machine learning algorithms to generate new rules and/or refine existing rules by adjusting parameters of those rules over time, as discussed further elsewhere herein.

At block 508, the redundancy scorer 322 compares characteristic(s) of the attendee user IDs based on the parameter(s) of the rule. The comparison may include comparing domain categories of each user ID based on the domain parameter(s) of the rule. In some implementations, the redundancy scorer 322 may compare one or more characteristic(s) of each user ID, and determine if a quantity of the same or similar characteristics exceeds a threshold parameter for that category.

For example, the threshold parameter may be that, for a meeting involving multiple diverse departments, if more than one user from a department attends a meeting, then the attendees from the same department are redundant. In this example, if two attendees from the accounting department attend the meeting than the redundancy scorer 322 determines that the accounting department has one redundant person in the meeting.

In a further example, the parameter(s) of the rule may include an algorithm for determining suitable levels of attendees from the same or different departments, maximal and minimal seniority mix that should be present at the meeting, a limit on cost of the meeting based on attendees in attendance, etc., and the redundancy scorer 322 may use the algorithm and the attendee characteristics to score the attendee composition for redundancy.

At block 510, the redundancy scorer 322 may generate a meeting score based on the comparison. The meeting score may be a value ranging from a predetermined minimum and maximum. For instance, the meeting score may include a redundancy value reflecting the overall attendee redundancy of the meeting. The redundancy value may be integer, fraction, or percentage, and may reflect the level of redundancy of the meeting attendees of a meeting. The meeting score may be multi-dimensional (e.g., a vector, array, etc., and may specify which attendees are redundant and may quantify the redundancy using scalar values (e.g., ranging from a preset minimum to maximum (e.g., 0-10)). The redundant attendees may be attendees that to not fully satisfy one or more parameters of the applicable rule.

In some implementations, redundancy scorer 322 may tag the meeting with the redundancy value (e.g., number) representing the meeting score in the data store 131. For example, the redundancy value may indicate the number of redundant attendees present in the meeting. E.g., meetings with no redundancy may have a redundancy value of zero, meetings with two redundant attendees may have a redundancy value of two, etc. As a further example, if the two attendees from the accounting department attend the meeting and the redundancy rule limits the amount of attendees from the accounting department to one, then the redundancy value is one to reflect the one redundant attendee from the accounting department.

Figure 6:
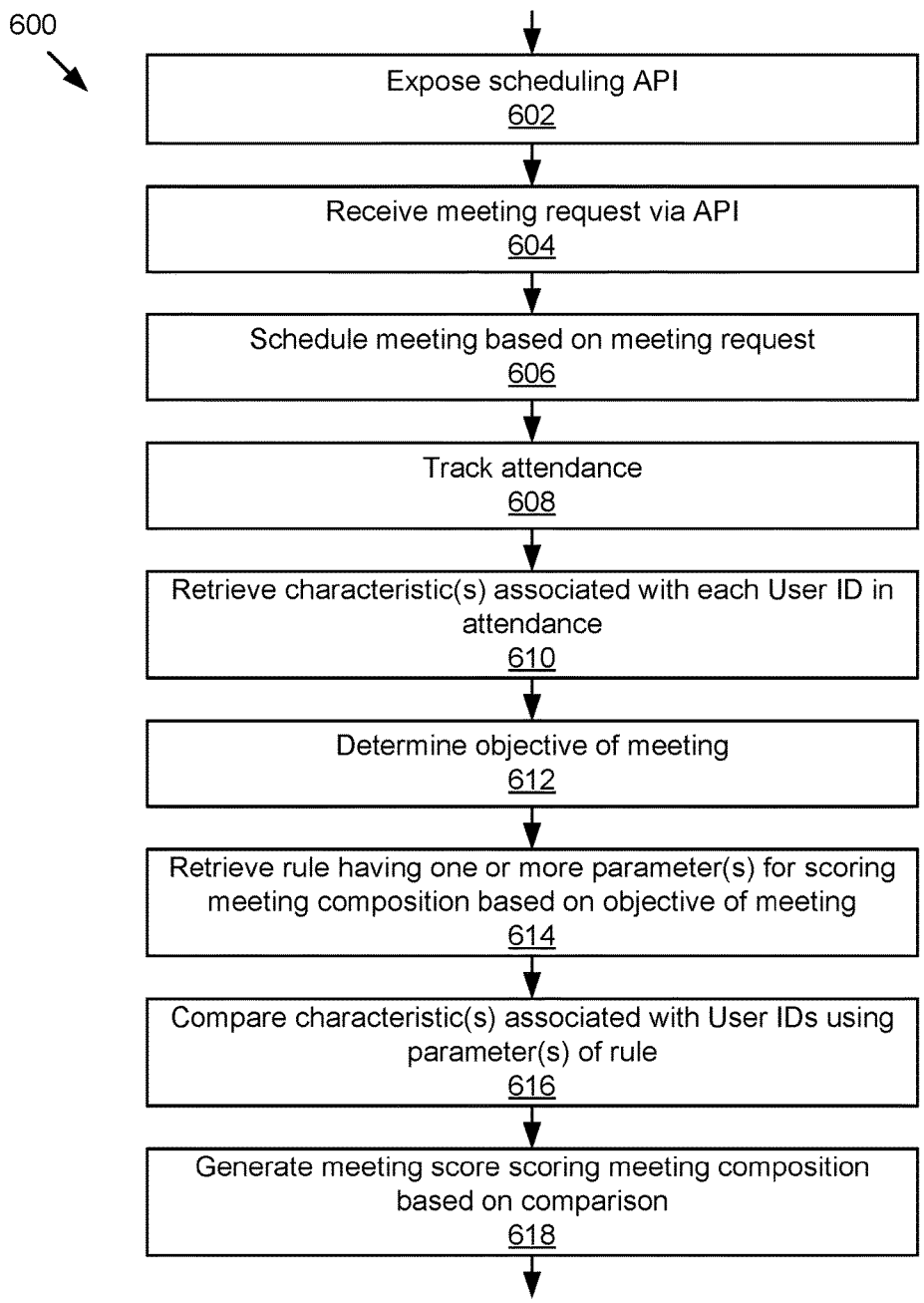
FIG. 6 is a flowchart of a further example method for scoring meeting composition.

FIG. 6 is a flowchart of a further example method for scoring meeting composition. In block 602, the management engine 130 (e.g., the scheduling engine 324) exposes a scheduling API for scheduling meetings. In some implementations, the scheduling API may be exposed, and the portal application 108 may access the scheduling API to schedule a meeting (e.g., by submitting meeting request-related data via the API to the management engine 130). The user 112 may use a scheduling interface of the portal application 108 to input the specifics of the meeting request and/or receive directive feedback during the scheduling of the meeting (e.g., regarding invitee redundancy, cost, etc., as applicable).

In block 604, the scheduling engine 324 receives a meeting request via the scheduling API from one or more endpoints of a computer network 102. In some implementations, the meeting request may be received from the portal application 108 of the client device 106, a scheduler 144 of a node 143, etc.

In block 606, the scheduling engine 324 may schedule the meeting based on the meeting request. The meeting request may be transmitted once the meeting data has been input and confirmed by the user using a scheduling interface, or may be asynchronously transmitted as the user populates the various fields of the scheduling interface. Scheduling the meeting may include generating a meeting entry (including a unique meeting ID) for the meeting, and storing the entry in the data store 131 (e.g., as meeting data 440). In some implementations, the scheduling engine 324 may parse the meeting request determine the elements of the meeting, such as the location, time/date, organizer, invitees, room ID, etc., and generate and store the meeting entry using the parsed data.

In block 608, the management engine 130 tracks attendance at the meeting. In some implementations, the management engine 130 may track the attendance by receiving user ID information from a node 143 installed at the location of the meeting, receiving attendance confirmations from the attendees via the portal application 108 (e.g., a response to an electronic meeting invitation indicating that an attendee will be at the meeting), etc. Other suitable techniques for tracking attendance may also be used, such as those discussed elsewhere herein.

In block 610, the redundancy scorer 322 retrieves characteristics associated with each user ID in attendance. The redundancy scorer 322 may retrieve the characteristics associated with each user ID by using the user ID to access user data 410 associated therewith in the data store 131. In some implementations, the redundancy scorer 322 may retrieve pre-generated domain(s) associated with the user IDs of the attendees, and/or may signal the domain categorizer 320 to generate the domains using one or more characteristics associated with the user IDs, such a department, cost to organization, position, etc., as discussed elsewhere herein.

In block 612, the redundancy scorer 322 determines an objective of the meeting (also called a category or meeting type). In some implementations, the redundancy scorer 322 may determine an objective of the meeting by parsing the meeting request for objective-related information (e.g., inclusion or exclusion of certain keywords), and determining the objective based thereon.

An objective may be implicit or explicitly defined. For example, an objective may be determined based on the role of the organizer. For instance, if the organizer (or an executive administrator thereof) is an executive in the organization, and schedules a meeting with multiple department heads that report to the organizer, the objective may be determined as a management meeting. In a further example, an objective may be more explicit based on a subject of a meeting. For instance, if the meeting subject is "1 on 1", "All hands meeting" or "Department meeting," the object may be readily defined as such by the redundancy scorer 322.

In a further implicit objective example, the redundancy scorer 322 may determine an objective of the meeting by analyzing the various departments of the attendees. For example, the attendees of a reoccurring meeting may all be from a human resources department, and the redundancy scorer 322 may, over several iterations, learn using a neural network, decision tree, or other suitable machine learning algorithm, that meetings that 1) only include attendees from the human resources department, 2) are scheduled by a person having the title of trainer, and 3) occur once a month, are human resource training meetings and the objective of the meeting is departmental training.

As a further example, the redundancy scorer 322 may identify meetings based on the corresponding stored meeting entries involving/requiring attendance by multiple departments and retrieve a rule governing attendance by individuals from those departments to avoid over-coverage and efficiency loss (e.g., 2 departments in a meeting with 4 levels/classes of employees may exceed threshold parameters of the rule for meetings involving two departments and result in a poor (e.g., high) meeting composition score). In contrast, a different rule may apply to a division-wide or company-wide meeting where attendance by multiple levels/classes of employees may be desirable.

In some implementations, the redundancy scorer 322 may be able to analyze historical data of previously scheduled meetings and determine the objective of the current meeting by finding similar meetings in the historical data, and/or access calendar data to identify future events on the calendar for which objectives are known and determine the objective of the instant meeting based on the future events. For example, the calendar data may include that a new product is launching in a week and the meeting includes attendees from the product development team, therefore the redundancy scorer 322 may identify the objective as a meeting related to the product launch.

In block 614, the redundancy scorer 322 may retrieve a rule having one or more parameters from the data store 131 for scoring meeting composition based on the objective. In this implementation, the rules 430 stored in the data store 131 may be segmented and retrievable by objective. This advantageously allows the redundancy scorer to score redundancy of different meeting types differently without necessitating human assistance or input. The different types of meetings may be determined based on the differing meeting objectives. Stated another way, by retrieving and using different rules for different types of meetings, the meeting composition scores may more accurately reflect actual redundancies in the meetings, which reduces the number of false positives that may be identified and increases user confidence in the system.

In some implementations, the redundancy scorer 322 may retrieve a single rule related to the objective of the meeting and the single rule may have one or more parameters for scoring meeting composition. In further implementations, the redundancy scorer 322 may retrieve a plurality of rules having one or more parameters based on the objective of the meeting, may generate multiple initial meeting compositions scores using the different rules, and generate a final meeting score based on the initial meeting composition scores. The redundancy scorer 322 may select the final meeting score from among the initial scores, may use standard outlier filtering to filter out scores that deviate from a median or mean score beyond a certain threshold and select a final score from the remaining scores, may average the initial scores or a subset thereof to determine the final score, etc. In further implementations, the redundancy scorer 322 may retrieve default rules that may be pre-defined for scoring meeting compositions.

In some embodiments, redundancy may be determined by a sufficient number of factors (from disparate data types, such as historical behavior, the user data, etc.) to find overlapping attributes between attendees, such as overlapping attributes within the organizer user ID's department/domain. For instance, if an organizer schedules a meeting with him/herself, and three other users (1, 2, and 3), the meeting is less likely to include redundant attendees given the limited number of users involved (even though users 1 and 2 could be considered largely equivalent, and in the same department, etc.). In contrast, if the organizer schedules a meeting with his/herself, user 3 (a technical person), and 6 other users that are all sales people, there is more likely to be redundancy because of the ratio of sales people than technical people. As such, the redundancy scorer 322 considers precedence, based in the domains and an applicable rule, to find overlapping attributes and flag redundancy. Over time, based on multiple similar response characteristics (e.g., accepted behavior) and electronic feedback (e.g., employee feedback) received from users, the management engine 130 may (re)define and (re)categorize rules.

In block 616, the redundancy scorer 322 compares the characteristic(s) associated with the user IDs of the attendees using the parameter(s) of the rule. The redundancy scorer 322 may perform the comparison based on the parameter(s) of the rule. The comparison may include identifying similar characteristic(s) between attendees, determining a quantifiable difference between characteristic(s) of attendees, identifying characteristic(s) that are not present but required based on a parameter, summing up a total quantity or cost of a specific characteristic of attendees, etc. In some implementations, the characteristics retrieved in block 610 may depend on the rule retrieved in block 614. For instance, the parameter(s) of a given rule may rely on certain characteristics, which are determined after the rule is identified using the objective determined in block 612. In some implementations, the characteristic(s) used to determine domains may be weighted as discussed elsewhere herein. For instance, user level may be considered more weighty a location or a cost in some cases.

In block 618, the redundancy scorer 322 generates a meeting score scoring composition of the meeting based on the comparison. The meeting score may be a quantitative value measured relative to a scale. The scale may be fixed or relative to the meeting. For instance, the scale may be fixed based on the number of attendees, and the score may reflect the number of redundant attendees. In another example, the score may be a percentage reflecting the percentage of attendees that are redundant. In another example, the score may be multi-dimensional and specify which specific users are redundant and which are not by domain. Other variations are also possible and contemplated.

Figure 7:
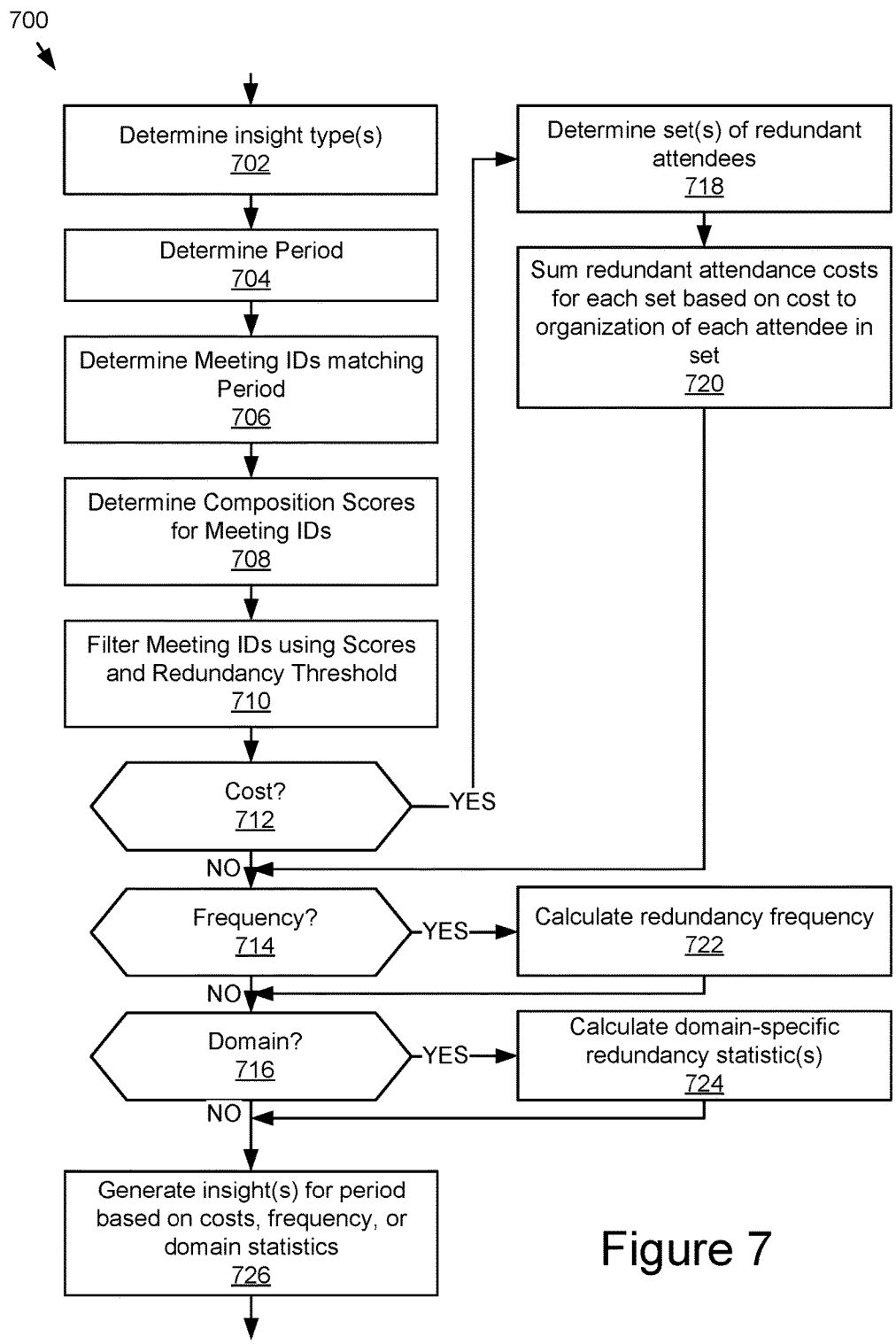
FIG. 7 is a flowchart of an example method for generating insights.

FIG. 7 is a flowchart of an example method 700 for generating insights. At block 702, the analytics engine 326 may determine insight type(s). Each insight type may describe a different impact meeting redundancy may have on an organization. Impact may be quantitative or qualitative in nature. Example insight types may segmented by cost, frequency, and/or domain, etc.

As a further example, insights may be segmented by which users organized the most meetings, which meetings had the highest average domain redundancy, which users had lowest meeting composition scores, which recurring meetings saved the company the most money, etc. By extracting these insights, stakeholders may be presented with behavior-altering information that otherwise would not be discernable using known solutions.

At block 704, the analytics engine 326 may determine a period. The period may be a period over which the insights may be generated. Example periods may include a week, 10 days, a month, a quarter, a year, etc. In some implementations, the analytics engine 326 may receive user input via an analytics interface specifying the period for which to generate insights.

At block 706, the analytics engine 326 may determine meeting IDs matching the period. In some implementations, the analytics engine 326 may access meeting data stored in the data store 131 and identify scheduled meetings that fall within the period. The analytics engine 326 may then determine the unique meeting IDs for each specific entry within the period. The meeting IDs may be unique identifiers assigned by the scheduling engine 324 when a meeting is scheduled and/or stored in the data store 131.

At block 706, the analytics engine 326 may determine meeting composition scores for each of the meeting IDs. The analytics engine 326 may access each the data entries related to the meeting IDs and retrieve the meeting composition scores stored in the data entries in the data store 131. In some implementations, the analytics engine 326 may signal the redundancy scorer 322 to generate and provide meeting composition scores for each of the meeting IDs as described elsewhere herein, rather than retrieving a previously generated meeting composition score.

At block 710, in some implementations, the analytics engine 326 may filter the meeting IDs using the composition scores and a redundancy threshold. In further implementations, the analytics engine 326 may leave the meeting IDs unfiltered. A redundancy threshold may be a predefined threshold for different insight type and any composition scores that exceed the threshold in some way may be flagged for use in generating insights.

At block 712, the analytics engine 326 determines whether to generate cost-related statistic. If the determination in block 712 is negative, the analytics engine 326 may proceed to other operations of the method 700, such as blocks 714, 716, or 718, or may terminate. If the determination in block 712 is affirmative, the analytics engine 326 determines set(s) of redundant attendees in block 718. The analytics engine 326 may determine set(s) of redundant attendees by identifying user IDs that share a similarity (e.g. a similar characteristic, a similar meeting compositions score, etc.) and those user IDs that share the similarity may be grouped into a set by the analytics engine 326.

Next, at block 720, the analytics engine 326 may sum the redundant attendance costs for each set based on a cost to an organization of each attendee in the set. The attendance costs may be the cost of the time that each of the redundant attendees could have been doing something other than attending the meeting. In some implementations, the analytics engine 326 may calculate a monetary value for each of the user IDs for each of the meeting IDs that exceeded the cost threshold at block 712. The monetary value may be a value of what the redundant attendee would have been paid by the organization for the time of each of the meeting IDs. The analytics engine 326 may access a salary, benefit, and/or payment value in the user tables related to each user ID to determine a cost of each attendee. The analytics engine 326 may then sum up all of the monetary values for each of the attendees to provide the total cost to the organization over the time period where the redundant attendees where paid to attend a meeting that they did not need to be at.

At block 714, the analytics engine 326 determines whether to generate frequency-related statistic. If the determination in block 714 is negative, the analytics engine 326 may proceed to other operations of the method 700, such as blocks 716 or 718, or may terminate. If the determination in block 714 is affirmative, the analytics engine 326 may calculate a redundancy frequency at block 722. In some implementations, the redundancy frequency may be the number of times a specific redundant meeting occurred over the period, the number of times a specific user ID organized a redundant meeting, the number of times a specific user was redundant in various meetings, etc.

At block 716, the analytics engine 326 determines whether to generate domain-related statistic. If the determination in block 716 is negative, the analytics engine 326 may proceed to other operations of the method 700, such as blocks 716 or 718, or may terminate. If the determination in block 714 is affirmative, the analytics engine 326 may calculate domain-specific redundancy statistic(s) in response to the domain threshold being exceeded. The domain-specific redundancy statistic(s) may identify specific domains that caused meetings to include redundant attendees over the period.

At block 726, the analytics engine 326 may generate insight(s) for period based on cost, frequency, or domain statistics. The analytics engine 326 may generate insight(s) by creating tables of data organizing the cost, frequency, or domain statistics and then identifying trends or outliers in the tables. In some implementations, the insight(s) may presented to a user on a graphical user interface, such as the graphical user interface depicted in FIG. 10. In some implementations, the insight(s) may be generated in real-time as a meeting is being scheduled, while in other implementations, the may be generated after meetings have occurred at the request of a user 112. The insight(s) may inform a user 112 or an organization of which user have organized the most meetings, with the highest average domain redundancy. In further implementations, the insight(s) may inform the user 112 or an organization of the total number of people hours and equivalent salary that could have been saved by eliminating domain redundancy within meetings. In further implementations, the insight(s) may inform the user 112 or an organization of which teams/departments schedule meetings with domain redundancy and compare the average redundancy by teams/departments.

Figure 8:
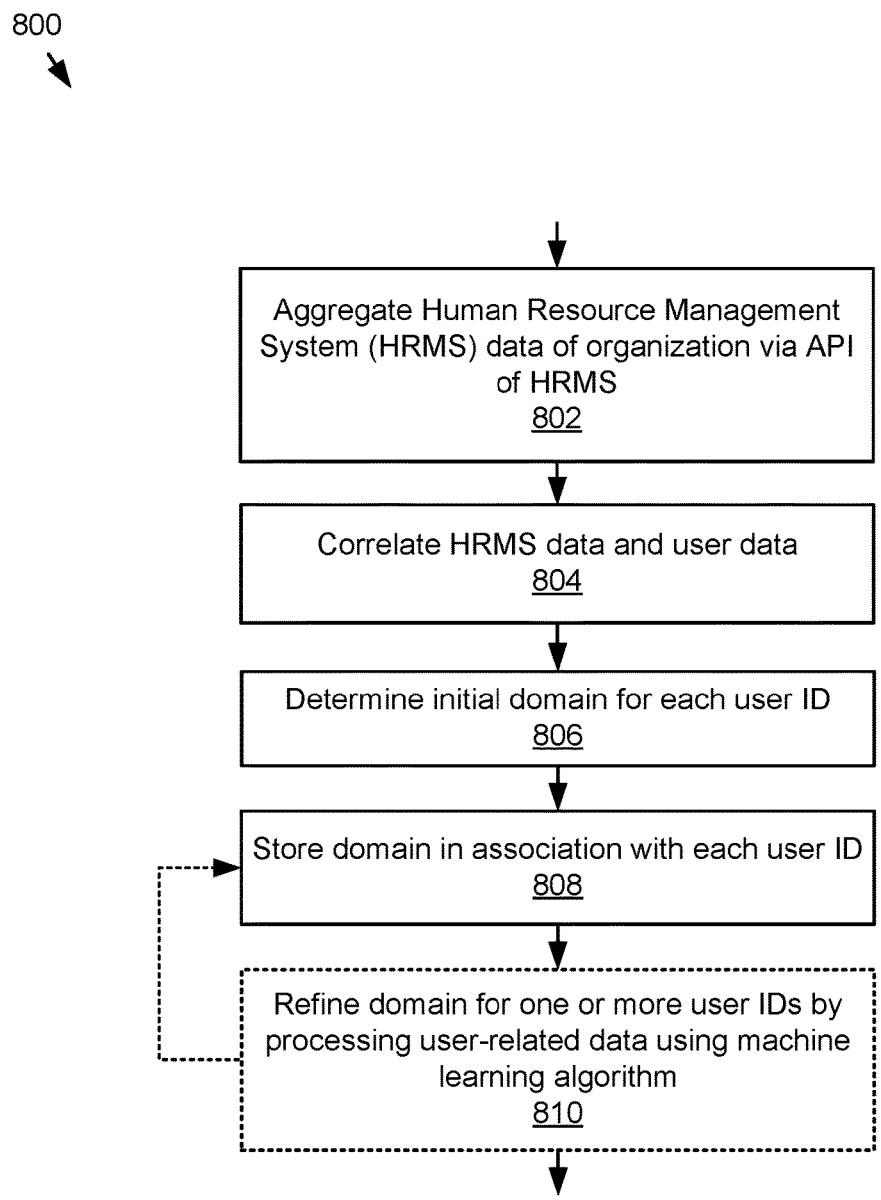
FIG. 8 is a flowchart of an example method determining domains for users and/or refining domains for users.

FIG. 8 is a flowchart of an example method 800 for determining domains for users and/or refining domains for users. At block 802, the domain categorizer 320 may aggregate HRMS data of an organization via an API of the HRMS. The HRMS may be a third party server 150 as depicted in system 100. The domain categorizer 320 may be configured to receive the FIRMS data from the third party server 150 and incorporate that data into the user tables stored in the data store 131, as discussed elsewhere herein. For instance, the domain categorizer 320 may aggregate the FIRMS data, identify portions of the aggregated data that are relevant to domain information, generate domains based on the relevant information, and storing the relevant information and/or generated domains as user data 410, while discarding the non-relevant portions of the HRMS data.

At block 804, the domain categorizer 320 may correlate the HRMS data and user data. The user data may be user data stored in the user tables. The domain categorizer 320 may correlate the data by identifying portions of the HRMS data that correlate to portions of the user tables and incorporating the identified portions. The domain categorizer 320 may correlate the HRMS data and the user data by linking the two sets of data with a user ID, such as an email address, employee number, etc., common to both sets of data.

At block 806, the domain categorizer 320 may determine an initial domain for each user ID. The initial domain may be determined using the correlated HRMS data and user data. The initial domain may be a default domain that each user ID is assigned. In some implementations, the initial domain may be a "department" for each user ID. In further implementations, the domain categorizer 320 may create a domain entry in the user table and the domain entry may be populated by HRMS data related to domains, such as a department, a title, a position, a salary, a manager, etc. The domain may represent the competency and skill level of a user associated with the user ID. In further implementations, the domain categorizer 320 may define organizational domains as a combination of a department, a salary, number of managers, and/or job title. In further implementations, the domain categorizer 320 may further define the initial domain by identifying significant differences in salary between meeting participants within the same department. In some implementations, significant differences may be defined at the organizational level, while in other implementations a decision tree learning algorithm may further refine the definition of "significant difference in salary." In further implementations, the domain categorizer 320 may further define the domains by identifying a hierarchal relationship, such as the number of direct managers that have been established within the HRMS data.

At block 808, the domain categorizer 320 may store the domain in association with each user ID. The domain categorizer 320 may store the domain in the user table associated with each user ID. At block 810, the domain categorizer 320 may refine the domain for one or more user IDs by processing user-related data using a machine-learning algorithm. In some implementations, the domain categorizer 320 may use historical data and machine learning to take into account an attendee's sphere of influence and/or workplace footprint and incorporate the sphere of influence and/or workplace footprint into the domain. The sphere of influence may be a description of who reports to the attendee, what projects the attendee manages, how the attendee associates with, reports to, or interacts with other attendees. The sphere of influence may be determined by analyzing the composition of various meetings that include the attendee and/or incorporating user feedback from previous meetings related to the attendee. The workplace footprint may indicate where the attendee has affects outside of the direct department and managing structure.

Figure 9:
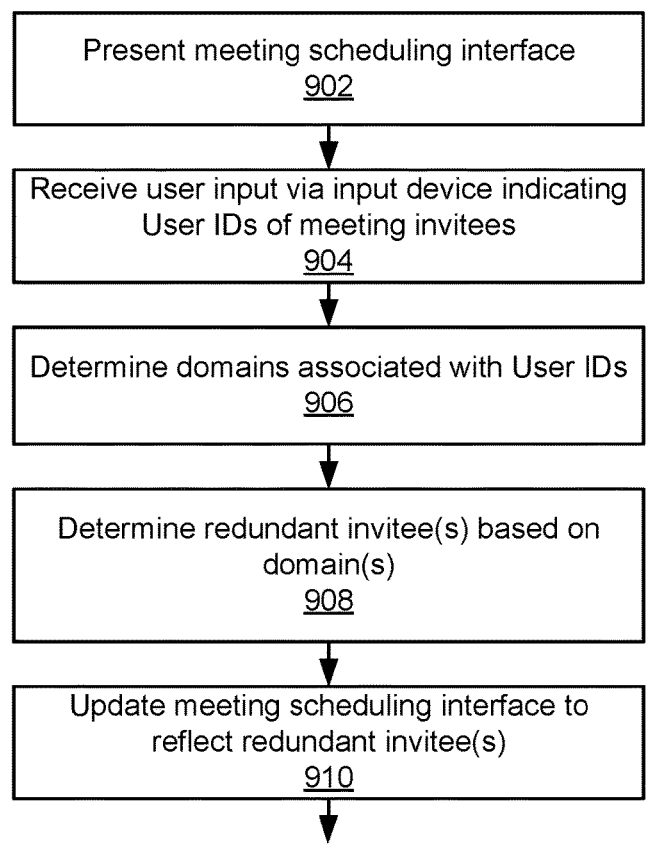
FIG. 9 is a flowchart of an example method for dynamically generating meeting composition recommendations.

FIG. 9 is a flowchart of an example method 900 for dynamically generating meeting composition recommendations. At block 902, the portal application 108 or scheduler 144 may present a meeting scheduling interface. The meeting scheduling interface may be presented on a node 143 and/or a client device 106. The portal application 108 or scheduler 144 may present the meeting scheduling interface such that a user 112 may interact with the meeting scheduling interface and input information related to scheduling a meeting. At block 904, the portal application 108 or scheduler 144 may receive user input via an input device 312 indicating one or more user IDs of meeting invitees. In some implementations, the user IDs may be emails or other unique identifiers of invitees of meetings. The portal application 108 or scheduler 144 may receiving these user IDs and provide the user IDs to the scheduling engine 324, which may store and/or provide the user IDs to the redundancy scorer 322.

At block 906, the redundancy scorer 322 may determine one or more domains associated with each of the user IDs. The domains may be information representing each of the invitees' competency and skill level as discussed elsewhere herein. The redundancy scorer 322 may determine the domains by looking up the specific user IDs in the user data 410. In some implementations, the redundancy scorer 322 may retrieve one or more predetermined domain for each user ID, or may instruct the domain categorizer 320 to determine the domain(s) based on retrieved characteristics of the users using the user IDs, as discussed elsewhere herein.

At block 908, the redundancy scorer 322 may determine redundant invitee(s) based on the domain(s). The redundancy scorer 322 may determine redundant invitee(s) by retrieving a rule for meeting composition and comparing the domain(s) of the invitees based on the rule as described elsewhere herein. In further implementations, the redundancy scorer 322 may identify user IDs that have similar domain(s) and flag those user IDs as redundant invitee(s).

At block 910, the scheduling engine 324 may receive the data identifying the redundant invitees from the redundancy scorer 322 or the data store 131 (as stored or cached by the redundancy scorer 322), and may provide the data identifying the redundant invitees (e.g., in the form of structured data such as HTML, JSON, XML, or other suitable structured data) to the portal application 108 or scheduler 144. Responsive to receiving the data, the portal application 108 or scheduler 144 may process the data and update the meeting scheduling interface to reflect redundant invitee(s).

In some implementations, the meeting scheduling interface may display a list of invitee(s) and the portal application 108 or scheduler 144 may highlight the user IDs associated with the redundant invitee(s). In further implementations, the scheduling engine 324 may provide alternative indications associated with the user IDs of the redundant invitee(s). In some implementations, the meeting schedule interface may be updated to display a message indicating the redundant invitee(s).

In some implementations, the scheduling engine 324 may generate and send an electronic notification via the network 102 to an electronic address of the organizer or another stakeholder including data describing the meeting and a notification that one or more of the invitees of the scheduling meeting are redundant. The notification may further include a link to edit the meeting entry to revise the attendee list, an option to electronically message the redundant attendee(s) to confirm whether they should attend, etc. In some instances, the scheduling engine 324 may generate and send an electronic message (e.g., email, text message, etc.) to electronic addresses of the redundant attendees via the network 102, and/or the electronic address of a manager of the redundant attendees, asking for input on whether they believe they need to attend the meeting. The meeting data 440 embodying the meeting may include user IDs of those users and the scheduling engine 324 may utilize the user IDs to determine the electronic addresses.

In some implementations, the portal application 108 or scheduler 144 may generate and display an analytics interface including a report describing redundant meetings that have occurred over various periods of time. The report may be segmented by various attributes, such as department, manager, attendee, organizer, etc. The analytics engine 326 may generate the data embodying the report using the user data 410, meeting data 440, analytics data, etc., stored in the data store. In some implementations, the analytics may be presented in a separate interface from the meeting scheduling interface. In further implementations, the meeting scheduling interface may include a content region and/or link to the analytics data to inform the organizer of past scheduling behavior while scheduling the meeting.

Figure 10:
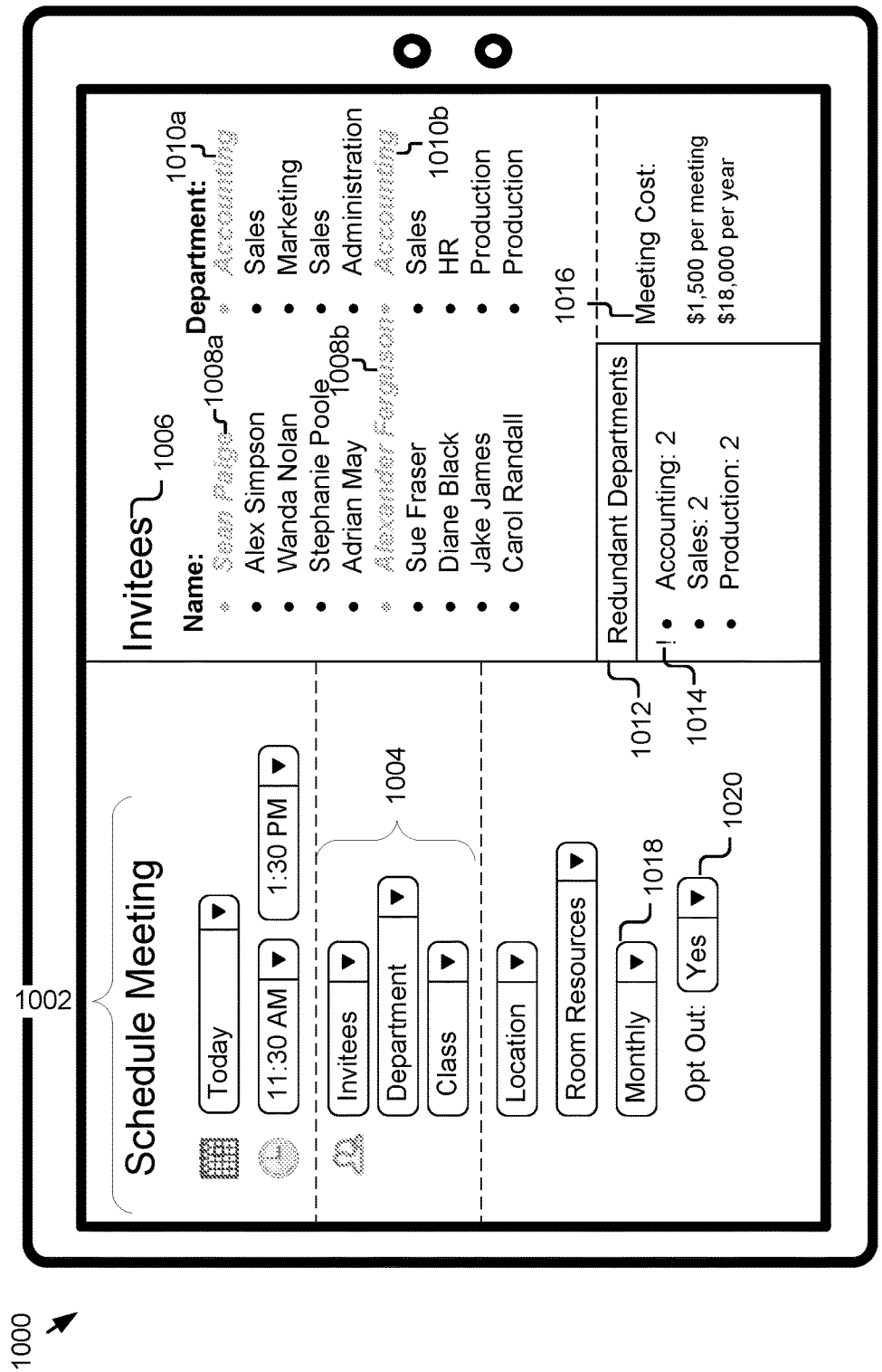
FIG. 10 is a graphical representation of a meeting scheduling interface including dynamically generated meeting composition recommendation(s).

FIG. 10 is a graphical representation of a meeting scheduling interface 1000 including dynamically generated meeting composition recommendation(s). The meeting scheduling interface 1000 includes a meeting scheduling section 1002 indicating to a user that a meeting is being scheduled. The meeting scheduling section 1002 may include various tabs and/or menus that a user may interact with to select various information, such as a date, a duration (e.g., start time and stop time), a location, a specification of room resources, etc. The meeting scheduling section 1002 may also include an invitee section 1004 that allows a user to specify a quantity of invitees and/or enter specific invitees using a user ID and/or name. In some implementations, the invitee section allows for departments, classes, or other domain related information to be selected for sorting or assisting in sending invites to invitees.

In some implementations, the meeting scheduling section 1002 may provide a recurring tab 1018 that allows a user to designate a period of recurrence for the meeting being scheduled. An invitees section 1006 may also be displayed on the meeting scheduling interface 1000. The invitees section 1006 may display the names and/or user ID of the invitees as well as domain information, such as the department each user ID is associated with.

In some implementations, the redundancy scorer 322 may determine a redundancy of the invitees in real-time, as discussed elsewhere herein. The redundancy scorer 322 may determine redundant invitees 1008 using various meeting composition rules. Data describing the redundant invitees 1008 may be provided by the management engine 130 to the portal application 108 or scheduler 144 for display. In the meeting scheduling section 1002 shown, two redundant invitees 1008 are displayed, Sean Paige 1008*a* and Alexander Ferguson 1008*b*. In generating the score, the redundancy scorer 322 may use a rule that only one member of the accounting department should be at the meeting.

The redundant invitees 1008 may be highlighted along with their redundant departments 1010 to indicate to the user the redundant invitees 1008. In some implementations, the analytics engine 326 may also provide insights related to the redundant invitees. In this example, the department insight 1012 displays departments that include multiple invitees. The accounting department, sales department, and production department all include two invitees to the meeting. The redundancy scorer 322 may retrieve various rules that only one member of the accounting department should be present at the meeting. Based on this rule, the redundancy scorer 322 may determine the accounting members are redundant, and the scheduling engine 324 and/or analytics engine 326 may provide the portal application 108 or scheduler 144 with data indicating that the accounting department has redundant users, which the portal application 108 or scheduler 144 may update the interface 1000 to display.

The scheduling engine 324 and/or analytics engine 326 may provide additional insights for display in the interface 1000. In this example, the analytics engine 326 calculates the meeting cost 1016 if the redundant invitees 1008 were to attend. In this example, if the redundant invitees 1008 were to attend the meeting, the company would spend $1500 per meeting and $18000 per year paying for the redundant invitees 1008. A user 112 interacting with the meeting scheduling interface 1000 may be able to remove one or more redundant invitees 1008 from the invitees section 1006 before the invitees are invited to the meeting. In some implementations, when a change is made to the invitee section 1006, the portal application 108 or scheduler 144 updates the invitees section 1006 to display any changes in redundant invitees and/or insights, based on updated analytics data received from the management engine 130 via the network 102.

In some implementations, an opt-out option 1020 may be designated by the user 112 organizing the meeting. The opt-out option 1020 may allow invitees to be notified that they are redundant and provide an option to the redundant invitees to opt-out of the meeting. In further implementations, once an invitee opts-out of the meeting, the redundancy scorer 233 may update the redundancies based on the changes in the invitees. In further implementations, the meeting scheduling interface 1000 may be displayed in different ways. For example, a report may be generated and displayed, a notification may be sent to individual invitees, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi') transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method for determining redundancy in a meeting, the method comprising:
   exposing, at a first computing system having one or more processors, access via a computer network to a scheduling application program interface (API) for scheduling meetings;
   receiving, at the first computing system via the computer network, a meeting request from a second computing system associated with a meeting organizer via the API, the meeting request being a request to schedule the meeting at a particular time and place;
   scheduling the meeting based on the meeting request by at least storing a corresponding data entry in a meeting data store;
   tracking attendance confirmation transmitted via the computer network from third computing systems associated with attendees of the meeting, the attendance confirmation including user IDs respectively associated with the attendees;
   retrieving characteristics associated with the user IDs from a user data store;
   determining, using the one or more processors, a meeting purpose;

based on the meeting purpose, retrieving from a rule data store a rule having one or more parameters for scoring meeting composition;

comparing, using the one or more processors, the characteristics associated with the user IDs using the one or more parameters of the rule, wherein one of the characteristics is a domain category, and wherein comparing the characteristics using the one or more parameters of the rule comprises determining whether a quantity of similar domain categories exceeds the one or more parameters;

generating, using the one or more processors, a meeting composition score based on the comparison;

identifying, using the one or more processors, redundant user IDs included in the meeting using the meeting composition score;

causing to be provided, in a graphical user interface of the second computing system, an indication of the identified redundant user IDs included in the meeting; and causing to be provided, in graphical user interfaces of the third computing systems, an opt-out function to one or more users associated with the redundant user IDs.

2. The method of claim 1, wherein determining the meeting purpose further comprises:
identifying, using the one or more processors, a meeting objective included in the meeting request; and
determining, using the one or more processors, a rule related to the meeting objective.

3. The method of claim 1, further comprising:
comparing, using the one or more processors, the meeting composition score to a previously generated meeting composition score; and
determining, using the one or more processors, an insight based on the comparison.

4. The method of claim 3, wherein the insight is one of a cost, a frequency, and a domain.

5. A computer-implemented method for scoring a composition of a meeting, the method comprising:
exposing, at a first computing system having one or more processors, access via a computer network to a scheduling application program interface (API) for scheduling meetings;
receiving, at the first computing system via the computer network, a meeting request from a second computing system associated with a meeting organizer via the API, the meeting request being a request to schedule the meeting at a particular time and place;
scheduling the meeting based on the meeting request;
retrieving user IDs of meeting attendees;
retrieving one or more characteristics associated with the user IDs;
retrieving a rule having one or more parameters for scoring meeting composition;
comparing, using the one or more processors, the one or more retrieved characteristics associated with the user IDs based on the one or more parameters of the rule, wherein one of the characteristics is a domain category, and wherein comparing the characteristics based on the one or more parameters of the rule comprises determining whether the domain category satisfies the one or more parameters;
generating, using the one or more processors, a meeting score based on the comparison;
identifying, using the one or more processors, redundant user IDs included in the meeting using the meeting score;

causing to be provided, in a graphical user interface of the second computing system, an indication of the identified redundant user IDs included in the meeting; and causing to be provided, in graphical user interfaces of third computing systems, an opt-out function to one or more users associated with the redundant user IDs.

6. The method of claim 5, wherein generating the meeting score is performed as part of scheduling the meeting and wherein retrieving user IDs of meeting attendees further comprises:
receiving the meeting request including the user IDs.

7. The method of claim 5, wherein retrieving the rule further comprises:
identifying, using the one or more processors, a meeting objective; and
determining, using the one or more processors, the rule based on the meeting objective.

8. The method of claim 5, further comprising:
comparing, using the one or more processors, the meeting score to a previously generated meeting score; and
determining, using the one or more processors, an insight based on the comparison.

9. The method of claim 5, further comprising:
providing the indication of the identified redundant user IDs included in the meeting attendees.

10. The method of claim 9, further comprising:
providing the opt-out function to the one or more users associated with the redundant user IDs.

11. A system comprising:
one or more computer processors; and
one or more memories storing instructions that, when executed by the one or more processors, cause the system to perform operations including:
exposing, at a first computing system having one or more processors, access via a computer network to a scheduling application program interface (API) for scheduling meetings;
receiving, at the first computing system via the computer network, a meeting request from a second computing system associated with a meeting organizer via the API, the meeting request being a request to schedule a meeting at a particular time and place;
scheduling the meeting based on the meeting request;
retrieving user IDs of meeting attendees;
retrieving one or more characteristics associated with the user IDs;
retrieving a rule having one or more parameters for scoring meeting composition;
comparing the one or more retrieved characteristics associated with the user IDs based on the one or more parameters of the rule, wherein one of the characteristics is a domain category, and wherein comparing the characteristics based on the one or more parameters of the rule comprises determining whether the domain category satisfies the one or more parameters; and
generating a meeting score based on the comparison;
identifying redundant user IDs included in the meeting using the meeting score; and
causing to be provided, in a graphical user interface of the second computing system, an indication of the identified redundant user IDs included in the meeting; and
causing to be provided, in graphical user interfaces, an opt-out function to one or more users associated with the redundant user IDs.

12. The system of claim 11, wherein generating the meeting score is performed as part of scheduling the meeting and wherein retrieving user IDs of meeting attendees further comprises:
   receiving the meeting request including the user IDs.

13. The system of claim 11, wherein retrieving the rule further comprises:
   identifying a meeting objective; and
   determining the rule based on the meeting objective.

14. The system of claim 11, further comprising:
   comparing the meeting score to a previously generated meeting score; and
   determining an insight based on the comparison.

15. The system of claim 11, further comprising:
   providing the indication of the identified redundant user IDs included in the meeting attendees.

16. The system of claim 15, further comprising:
   providing the opt-out function to the one or more users associated with the redundant user IDs.

17. One or more instances of computer-readable media collectively having contents configured to cause a input system to perform a method, the method comprising:
   exposing, at a first computing system having one or more processors, access via a computer network to a scheduling application program interface (API) for scheduling meetings;
   receiving, at the first computing system via the computer network, a meeting request from a second computing system associated with a meeting organizer via the API, the meeting request being a request to schedule a meeting at a particular time and place;
   scheduling the meeting based on the meeting request;
   retrieving user IDs of meeting attendees;
   retrieving one or more characteristics associated with the user IDs;
   retrieving a rule having one or more parameters for scoring meeting composition;
   comparing, using the one or more processors, the one or more retrieved characteristics associated with the user IDs based on the one or more parameters of the rule, wherein one of the characteristics is a domain category, and wherein comparing the characteristics based on the one or more parameters of the rule comprises determining whether a quantity of similar domain categories exceeds the one or more parameters;
   generating, using the one or more processors, a meeting score based on the comparison;
   identifying, using the one or more processors, redundant user IDs included in the meeting using the meeting score;
   causing to be provided, in a graphical user interface of the second computing system, an indication of the identified redundant user IDs included in the meeting; and
   causing to be provided an opt-out function to one or more users associated with the redundant user IDs.

* * * * *